US010268988B2

(12) United States Patent
Lim

(10) Patent No.: US 10,268,988 B2
(45) Date of Patent: Apr. 23, 2019

(54) SYSTEM AND METHOD FOR MULTI PARTY CHARACTERISTICS AND REQUIREMENTS MATCHING AND TIMING SYNCHRONIZATION

(71) Applicant: Shio Hwi Lim, Singapore (SG)

(72) Inventor: Shio Hwi Lim, Singapore (SG)

( * ) Notice: Subject to any disclaimer, the term of this patent is extended or adjusted under 35 U.S.C. 154(b) by 828 days.

(21) Appl. No.: 14/415,467

(22) PCT Filed: Jul. 17, 2013

(86) PCT No.: PCT/SG2013/000295
§ 371 (c)(1),
(2) Date: Jan. 16, 2015

(87) PCT Pub. No.: WO2014/014417
PCT Pub. Date: Jan. 23, 2014

(65) Prior Publication Data
US 2015/0170105 A1 Jun. 18, 2015

(30) Foreign Application Priority Data
Jul. 17, 2012 (SG) .................................. 201205294

(51) Int. Cl.
*G06Q 10/10* (2012.01)
*G06Q 10/06* (2012.01)

(52) U.S. Cl.
CPC ......... *G06Q 10/1095* (2013.01); *G06Q 10/06* (2013.01); *G06Q 10/109* (2013.01); *Y04S 10/54* (2013.01)

(58) Field of Classification Search
None
See application file for complete search history.

(56) References Cited

U.S. PATENT DOCUMENTS 8,259,925 B2 9/2012 Smith et al.
2001/0055311 A1* 12/2001 Trachewsky .......... H04L 1/0003
370/445

(Continued)

FOREIGN PATENT DOCUMENTS

WO WO2006057880 A2 6/2006
WO WO2008134352 A1 11/2008
WO WO2011140290 A1 11/2011

OTHER PUBLICATIONS

International Search Report dated Nov. 5, 2013 for corresponding application No. PCT/SG2013/000295.

(Continued)

*Primary Examiner* — Thomas L Mansfield

(57) ABSTRACT

A system, method and platform for multi-party characteristics and requirement matching and timing synchronization. One aspect of the invention relates to the plurality of users, such as consumer and provider, and provider's system parameters (820) or attributes (810, 820, 830, 840) that actualize the event or service. In some cases, the platform can obtain data from the user's network such personal service network (120), location provider network (110), or application device network (130) or capture user's requirements through other availability, recommend a match and allocation of the match on the provider's system parameters (820) upon confirmation from the users. It caters for time variant and estimation, compensation and adaptation of the user's characteristics with other users in the system. It minimizes loss time and maximizes utilization of the actors to the actualization of the event.

24 Claims, 15 Drawing Sheets

(56) References Cited

U.S. PATENT DOCUMENTS

| | | | |
|---|---|---|---|
| 2008/0076432 A1* | 3/2008 | Senarath | H04W 36/18 455/442 |
| 2008/0215446 A1 | 9/2008 | Lutnick et al. | |
| 2010/0332615 A1* | 12/2010 | Short | H04L 63/08 709/217 |
| 2012/0330710 A1 | 12/2012 | Hauser et al. | |

OTHER PUBLICATIONS

Written Opinion for Singapore Application No. 11201500221R dated May 5, 2016.
Hearing decision for corresponding GB Patent Application No. GB1502593.5 dated Oct. 3, 2016.
Examination report for corresponding GB Patent Application No. GB1502593.5 dated Apr. 16, 2015.
Examination report for corresponding GB Patent Application No. GB1502593.5 dated Jun. 16, 2015.
Examination report for corresponding GB Patent Application No. GB1502593.5 dated Jan. 5, 2016.

\* cited by examiner

| baseline | threshold | arrival time | time | day | month | season | state | src | weather | transport | class-label |
|---|---|---|---|---|---|---|---|---|---|---|---|
| 10min | | | | | | | | | | | |
| | 0 | 10 min | 1030 | Wed | Jan | | flu | none | home | sunny | car | 20min |
| | 10 | 20 min | 0830 | Wed | Jan | | flu | none | home | sunny | car | 20min |
| | 15 | 25 min | 0900 | Mon | Jan | | flu | att-kids | home | sunny | car | 30min |
| | 20 | 30 min | 0900 | Wed | Jan | | flu | none | home | rain | car | 30min |
| | 30 | 40 min | 0900 | Mon | Jan | | flu | att-kids | home | rain | car | 45min |
| 15min | | | | | | | | | | | |
| | 0 | 15 min | 9000 | Mon | Jan | | flu | none | home | sunny | train | 20min |
| | 5 | 20 min | 0830 | Wed | Jan | | flu | none | home | sunny | train | 20min |
| | 10 | 25 min | 0900 | Mon | Jan | | flu | att-kids | home | sunny | train | 30min |
| | 15 | 30 min | 0900 | Wed | Jan | | flu | none | home | rain | train | 30min |
| | 25 | 40 min | 0900 | Mon | Jan | | flu | att-kids | home | rain | train | 45min |
| 30min | | | | | | | | | | | |
| | 0 | 30 min | 9000 | Mon | Jan | | flu | none | work | sunny | train | 30min |
| | 5 | 35 min | 0830 | Wed | Jan | | flu | none | work | sunny | train | 45min |
| | 10 | 40 min | 0900 | Mon | Jan | | flu | meeting | work | sunny | train | 45min |
| | 15 | 45 min | 0900 | Wed | Jan | | flu | none | work | rain | train | 45min |
| | 25 | 55 min | 0900 | Mon | Jan | | flu | meeting | work | rain | train | 60min |

| time-window | distance | state | need | cycle-time | users | active-users-now-cluster | providers | active-p-cluster | class-arr-type | |
|---|---|---|---|---|---|---|---|---|---|---|
| | | $U_{,i}$ | | | | | $S_{,i}$ | | | $Y_{,i}$ |
| 45min | 15min | home | medium | 10min | 10000 | 25% | 100 | 10% | | -1 |
| 20min | 35min | work | medium | 10min | 10000 | 50% | 100 | 20% | | 0 |
| 70min | 60min | work | low | 10min | 10000 | 30% | 100 | 20% | | 0 |
| 30min | 20min | work | urgent | 10min | 10000 | 30% | 100 | 10% | | +1 |

SYSTEM AND METHOD FOR MULTI PARTY CHARACTERISTICS AND REQUIREMENTS MATCHING AND TIMING SYNCHRONIZATION

PRIORITY CLAIM

This application is a national phase of International Patent Application No. PCT/SG2013/000295 filed Jul. 17, 2013, which claims priority to the Singapore patent number 201205294-0 entitled "System and method for multiparty characteristics and requirements matching and timing synchronization" filed on 17 Jul. 2012, both of the above listed applications are herein incorporated by reference.

FIELD OF THE INVENTION

The present invention relates generally to systems, methods and platforms that connect users based on their characteristics and requirements and more specifically relates to systems, methods and platforms for connecting users relating to their characteristics and requirements and synchronizing their timing availability to actualize an event such as a meeting or a service.

BACKGROUND OF THE INVENTION

The advent of mobile communications, devices, sensors, wireless communication and communication networks provides the ability for users such as consumers to determine the providers' location, direction to the provider, and characteristics of the service or products that the providers' serves.

Such methods in the provision of information and interaction to the consumers and providers and other users are subject to real time variability of multi party and system parameters that are not visible and corrected to the actors in the system. These existing methods do not cater for the time variant and characteristics variant as users traverse through the sequence of events and time for the consumer arrival to the provider location or both consumer and provider's agent arrival to actualize the service, meeting, or the sales of product.

An example of such application is the health care industry, whereby the consumers are typically subjected to the content viewing of the provider's location, category and in some cases, availability. This open loop construct subjects consumers to wait time upon arrival, and providers faces challenges in instantaneous load of consumers' arrival, no show, and voids of underutilization if they take in appointments. Such variability changes according to type and category of patients, provider's category, physical environment (traffic, weather, location etc), seasonal load (flu epidemic, time of the year, day of the week etc) and cycle time, as well as doctors' arrival time (timing from surgery, out-patient consultation, research or visiting other hospitals and institutions).

In vehicle parking, some buildings provide real time information of car park lots available, which are made available in the form of web information, mobile information or local road transport signboard displays. To close the loop of visibility of the available parking lots to guaranteeing a place upon arrival time, methods such as booking service may be available in applications such as mobile applications or internet. Such services may employ predictive analytics to estimate the demand and supply to determine when the parking lots will be vacated to incorporate the advance pre-bookings or make the availability known to consumers to harness consumption. However, this is subject to model accuracy, assumptions, data size and real time variability of the users that may impair maximization of utilization of parking lots. It may also impose dissatisfaction of consumers who have booked the parking lot but suffer the penalty of grace time windows due to unforeseen conditions such as traffic conditions, weather or time latency that incurs variance between the estimated arrival time from the booked time.

In the food and beverage industry, provisions for information of dining places and availability are currently growing with the advent of location based advertisements. However, this may be limited to the existing location of the users, and consumers and providers are still subject to the challenges of wait time, no shows, and voids of underutilization if they take in booking. Again, imposing penalties to both the consumers and providers that warrant a delay to the intended time may take a toll in the satisfaction compounded by the vast competition in the landscape these days. This could result in loss of revenue from losing consumers when they switch providers.

As a result, there is a need for a novel approach that provides coalition in matching of the users' characteristics and requirements, and connects their availability to cater for the real time variability to the actualization of the event, to minimize loss time and maximize utilization and contextual flow for all actors in the system.

SUMMARY OF THE INVENTION

In accordance with one aspect of the present invention, a system for matching user requirements, characteristics and service actualization in real time to decrease error rate of actualization of service slots, maximize utilization of the service slots by a plurality of users, maximize utilization of time of the plurality of users, and minimize wait time for the plurality of users. The system includes an estimator and a placeholder mechanism. The estimator determines static and dynamic characteristics within a demand and supply landscape of one of the plurality of users in response to one or more service slots and one or more queues of the one or more service slots and for determining static and dynamic characteristics of other ones of the plurality of users in response to the one or more service slots and the one or more queues of the one or more service slots. The placeholder mechanism placeholds one or more service slots in response to ones of the plurality of users, wherein the probability of actualization of the one or more of service slots corresponds to a likelihood of the one or more service slots being utilized by ones of the plurality of users, wherein the placeholder mechanism placeholds the one or more service slots in response to one or more criteria selected from the group of (a) holding or changing or actualizing the one or more service slots corresponding to ones of the plurality of users in response to the probability of actualization of the static and dynamic characteristics determined by the estimator and (b) holding or changing or actualizing the one or more of the service slots corresponding to ones of the plurality of users in response to the probability of actualization determined in response to an input of the one of a plurality of users, and wherein the one or more of service slots have at least one parameter in a plurality of parameters associated therewith indicating that it is a preferred one of the one or more service slots and one or more queues of the one or more service slots corresponding to ones of the plurality of users and indicating that it is one or more service slots corresponding to the ones of the plurality of users.

In accordance with another aspect of the present invention, a method is provided for matching user requirements, characteristics and service actualization in real time to decrease error rate of actualization of service slots, maximize utilization of the service slots by a plurality of users, maximize utilization of time of the plurality of users, and minimize wait time for the plurality of users. The method includes determining static and dynamic characteristics within a demand and supply landscape of one of the plurality of users in response to one or more service slots and one or more queues of the one or more service slots and for determining static and dynamic characteristics of other ones of the plurality of users in response to the one or more service slots and the one or more queues of the one or more service slots. And the method also includes placeholding one or more service slots in response to ones of the plurality of users and in response to one or more criteria selected from the group of (a) holding or changing or actualizing the one or more service slots corresponding to ones of the plurality of users in response to the probability of actualization of the static and dynamic characteristics determined by the estimator and (b) holding or changing or actualizing the one or more of the service slots corresponding to ones of the plurality of users in response to the probability of actualization determined in response to an input of the one of a plurality of users, wherein the probability of actualization of the one or more of service slots corresponds to a likelihood of the one or more service slots being utilized by ones of the plurality of users, and wherein the one or more of service slots have at least one parameter in a plurality of parameters associated therewith indicating that it is a preferred one of the one or more service slots and one or more queues of the one or more service slots corresponding to ones of the plurality of users and indicating that it is one or more service slots corresponding to the ones of the plurality of users.

In accordance with another aspect of the present invention, a non-transitory computer readable storage medium configured to store instructions that, when executed, perform a method for matching user requirements, characteristics and service actualization in real time to decrease error rate of actualization of service slots, maximize utilization of the service slots by a plurality of users, maximize utilization of time of the plurality of users, and minimize wait time for the plurality of users. In the non-transitory computer readable storage medium, the method includes determining static and dynamic characteristics within a demand and supply landscape of one of the plurality of users in response to one or more service slots and one or more queues of the one or more service slots and for determining static and dynamic characteristics of other ones of the plurality of users in response to the one or more service slots and the one or more queues of the one or more service slots. And in the non-transitory computer readable storage medium, the method also includes placeholding one or more service slots in response to ones of the plurality of users and in response to one or more criteria selected from the group of (a) holding or changing or actualizing the one or more service slots corresponding to ones of the plurality of users in response to the probability of actualization of the static and dynamic characteristics determined by the estimator and (b) holding or changing or actualizing the one or more of the service slots corresponding to ones of the plurality of users in response to the probability of actualization determined in response to an input of the one of a plurality of users, wherein the probability of actualization of the one or more of service slots corresponds to a likelihood of the one or more service slots being utilized by ones of the plurality of users, and wherein the one or more of service slots have at least one parameter in a plurality of parameters associated therewith indicating that it is a preferred one of the one or more service slots and one or more queues of the one or more service slots corresponding to ones of the plurality of users and indicating that it is one or more service slots corresponding to the ones of the plurality of users.

BRIEF DESCRIPTION OF THE DRAWINGS

FIG. 10B illustrates the exemplary master matrix for the estimated arrival time generation using baseline and threshold;

FIG. 10C illustrates the parameters in the functions $U_i$, $S_i$, $Y_i$, with Equation 7 and Equation 8;

DETAILED DESCRIPTION OF THE INVENTION

Figure 1:
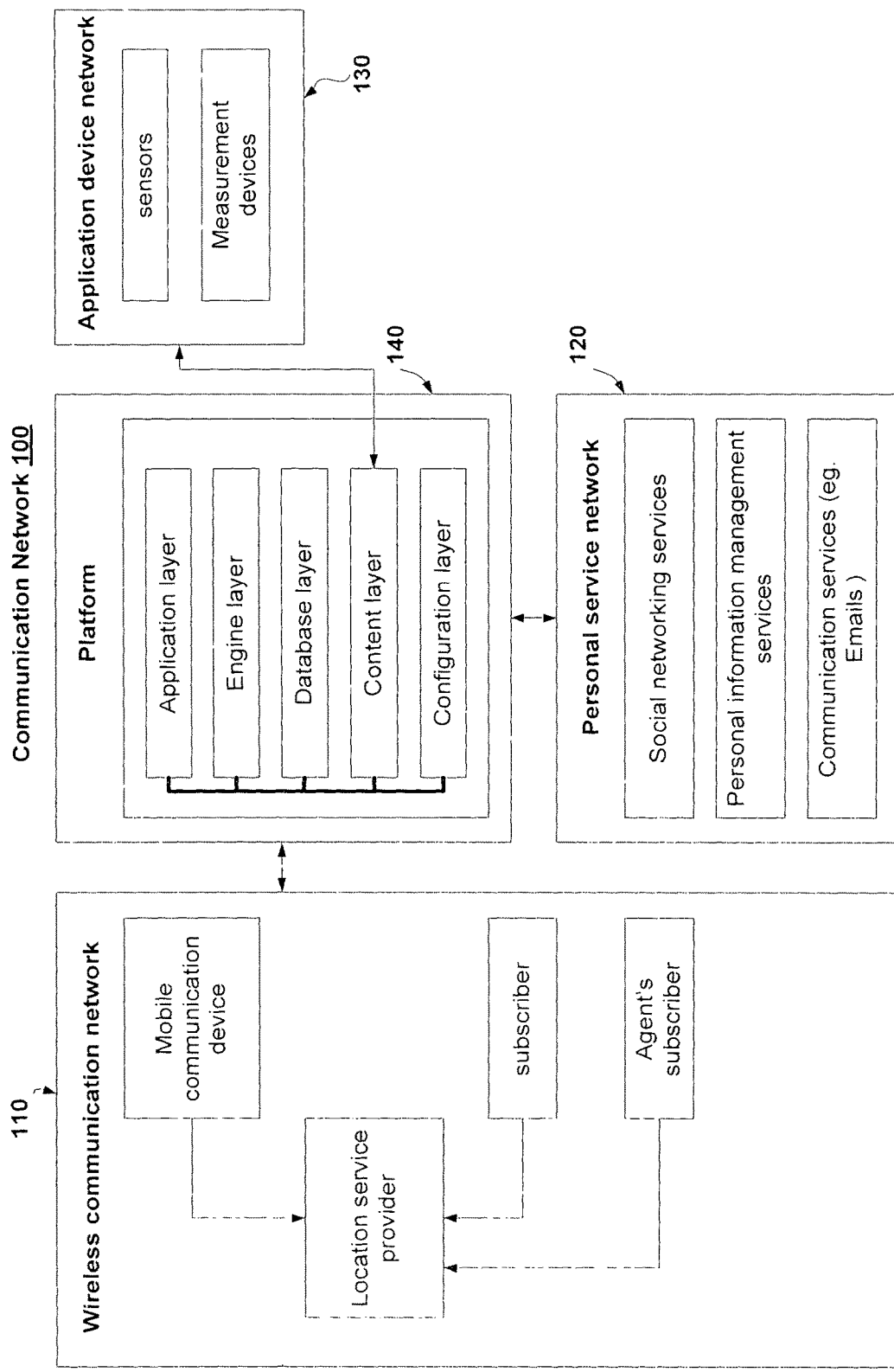
FIG. 1 illustrates an exemplary communication system with the wireless communication network, location service and the platform in an illustrative embodiment of the invention.

As used herein, "users" refers to the parties or persons involved in the connection of the actualization of the event or service.

As used herein, "actors" may represent roles played by human users, devices, objects, hardware, or other subjects are involved in the interactions of the system.

As used herein, a "consumer" refers to the party or person who is consuming the service.

As used herein, a "provider" refers to the party or person or entity who is providing the service.

As used herein, a "provider agent" refers to the party or person who is providing the service for the provider entity. Examples of this are health care services with the clinic as the provider, and the doctor as the provider agent.

As used herein, "cycle time" refers to the duration whereby the start and end to the service that has been or to be actualized.

As used herein, "service time" refers to the time whereby the service is intended or actualized.

As used herein, "slot" refers to service time slots.

As used herein, "single server queue" refers to service slots available in a single server. Examples of single server queue such as health care clinic served by a single physician.

As used herein, "multi server queue" refers to service slots available in multi servers. These multi servers can be within or outside the provider's service slots. Examples of multi servers queue such as health care clinic served by multi physicians, but allocation is based on consumer's preference, profile and timing. Multi-server queue outside the provider includes health care clinics served by different providers but lies within the preference, profile and match of the consumers. Another example of multi server queue is the parking lots within the same building provider. Each parking lot presents a single server queue whereby the parking lot is occupied or emptied. Multi server queue in parking lots outside the same building providers As used herein, "same day time window" refers to time period within the day whereby the service is intended and actualized.

As used herein, "online" refers to a state connectivity between the interaction of users and its real time information with the computing resource, communication network or the like.

As used herein, "offline" refers to a disconnected state between the interaction of users and its real time information with the computing resource, communication network or the like. Access of the users information can be based prior stored data.

As used herein, "upstream" refers to a state which is nearest to determining the service intent and further from the actualization of the service or event.

The headings used herein are for organization purposes only and are not meant to be used to limit the scope of the descriptions or claims.

The present invention illustrated below in conjunction with exemplary health care services associated with the wireless communication and network systems, context aware techniques and location base system. It should be understood, that the invention is not limited to use with any particular type of plurality of users, and the type of characteristics, content, requirement and matching associated with any timely delivery and actualization of the event, with any form of communication network.

While multiple embodiments are disclosed, still other embodiments of present invention will become apparent to those skilled in the art from the following detailed descriptions, which show and describe illustrative embodiments of the invention. As will be realized, the invention is capable of modifications in various aspects, all without departing from the spirit and scope of the present invention.

In describing a preferred embodiment of the invention illustrated with drawings, specific terminology is use for the sake of clarity. However, the invention is not intended to be limited to the specific terms exhibit for the selected exemplary scenario, and it is to be understood that each specific term includes all equivalents that operate in a similar manner to accomplish a similar purpose.

An example of an application of the present invention is the health care industry, whereby the consumers are typically subjected to the content viewing of the provider's location, category and in some cases, availability. This open loop construct subjects consumers to wait time upon arrival, and providers faces challenges in instantaneous load of consumers' arrival, no show, and voids of underutilization if they take in appointments. Such variability changes according to type and category of patients, provider's category, physical environment(traffic, weather, location etc), seasonal load (flu epidemic, time of the year, day of the week etc) and cycle time, as well as doctors' arrival time (timing from surgery, outpatient consultation, research or visiting other hospitals and institutions).

In the health care industry, which is still lacking from communication devices' technological advancement in the social platform such as social networking, health care consumers typically have to source for the health care providers and their availability. Communication network technology such as mobile applications or web base appointments, if they exist, are typically in the form of static appointment bookings or queue viewing. Health care consumers and providers are subject to variability of the time and characteristic variant of the users prior to the actualization of the appointments or medical service. Methods such as imposing penalty for the wait time or no show does not address customer and provider satisfaction fully, with time variant or characteristics variants that may not be subject to the control of both the consumers and providers. At the same time, there could be consumers and providers who readily and at the means of the actualization of the service in the vacated time by other users in the system. Such provisioning of the information to the relevant users real time that are in the characteristics, requirements and means of actualization of the service is not available.

While appointment base system platforms provisions for integration of loosely coupled silos in health care services, it does not channel the real time demand and supply base user's characteristics and traits. Optimum utilization, time to treatment and provision for consumer options cannot be achieved without the knowledge real time demand and supply such as vacated slots in the local system.

In the context of the health care industry, time factor is especially critical to both the consumer and provider. This may result in unwarranted agony of wait time in the health care consumer seeking medical service, as well as the cost of medical services that due to the under utilization, over time and sometime errors due to the enormous instantaneous load of the providers. It inherently addresses the capacity distribution load if such variability of the parameters could be minimized, hence, removing such unwarranted cost in the overhead cost of the medical service.

As such, existing methods and solutions that aims to tackle such wait time versus utilization tends to revolve around complex models that links to the internal workflow or operations, which is highly reliant on the accuracy, assumptions and data size of the mathematical models. In the dynamic and heterogeneous nature of the industry such as health care, real time variability of the actors in the systems such as the consumers and providers characteristics poses challenges in balancing real time demand and supply to maximize time utilization and minimize loss and productivity for all actors.

In vehicle parking, some buildings provide real time information of the car park lots available, which are made available in the form of web information, mobile information or local road transport signboard displays. To close the loop of visibility of the available parking lots to guaranteeing a place upon arrival time, methods such as booking service may be available in applications such as mobile applications or internet. Such services may employ predictive analytics to estimate the demand and supply to determine when the parking lots will be vacated to incorporate the advance pre-bookings or make the availability known the consumers to harness consumption. However, this is subject to model accuracy, assumptions, data size and real time variability of the users that may impair maximization of utilization of parking lots. It may also impose dissatisfaction of consumers whom has booked the parking lot but suffers the penalty of grace time window due to unforeseen conditions such as traffic conditions, weather or time latency that incurs that impairs the estimated arrival time from the booked time.

In the food and beverage industry, provision for information of the dining places and availability are currently growing with the advent of location base advertisements. However, this may be limited to the existing location of the users; and consumers and providers are still subject to the challenges of the wait time, no show, void of under utilizations if they take in booking. Again, imposing penalties to both the consumers and providers that warrant a delay to the intended time may take a toll in the satisfaction with the vast competition in the landscape these days. This could result in loss of revenue from losing the consumers when they switch the providers.

In examples of pre-booking for the service, event or space, users usually do not have the visibility of the likely availability at the instance of the time of the intended service. This subjects to the user the economic cost when the pre-booking price is enforced. On one hand, if the real time demand and supply prediction accuracy on the visibility of the likely availability differs from actual, the user may be subjected to inconvenience of losing the intended time preference for the service or space. On the other hand, the user is subjected to the economic cost incurred if service or space is available at the preferred time without the pre-booking cost.

The present invention discloses a method, system and platform that provide coalition between matching the characteristics and requirements of the users, with multi party users' availability catering for the real time changes in the time variant and characteristics variant path to the actualization of the event, maximizing contextual flow and minimize loss time for all actors in the system. The present invention is generated with minimum intervention of the users in the system.

One aspect of the invention relates to matching the characteristics and requirements of the users in the multi party users availability that maximizes the contextual flow, minimize wait time and loss time. In the context of users being consumers and providers, it minimizes under utilization and maximizes the load distribution with synchronization of the timely arrival of consumer, provider, or provider's agent. It caters for the variability in the provider's system parameters that are attributes to the actualization of the event.

In an embodiment, a system and method of providing the functions relating to the users characteristics in the estimation, recommendation, match, schedule, intervention and adaption in the self-adapt architecture. This to achieve the maximization of match, synchronization that caters to the time and characteristics variant of the users.

In an embodiment, a system and method of providing the maximization of the utilization of the users and minimize wait time without the presence of the size of the dataset and accuracy in the assumptions of the models.

In an embodiment, a system and method of providing the estimation of the arrival time and characteristics of the user with minimum user's configured input and no prior historical data of the user.

In an embodiment, a system and method of balancing real time demand and supply variability in the plurality of the users that works with no prior historical data set, or minimum data set, and improved performance with historical data set, with placeholder structure, intervention and adaptation methods, and system users characteristics through users preference and profile dynamic scheduling. The impact is maximization of utilization and minimum time loss of the actors in the system.

In an embodiment, a system and method of providing learning error rate of the users timing synchronization to the actualization of the appointment that decreases over time, especially within the time window of same day of appointment that maximizes the actor's time utilization.

In an embodiment, a system and method of providing real time matching and timing maximization to the users preference and profile that utilizes single or multi server queue systems. This is achieved without the employment of financial penalty incur such as those in prepaid systems.

In an embodiment, a system based and method based on the architectures of the components in the platform to provide the overall functionality of self-organize architecture of the platform to exploit the characteristics of the users in maximizes utilization of users time, and minimize wait time. The components include the above-mentioned systems and methods.

FIG. 1 shows a communication network system 100 in an illustrative embodiment of the invention. The communication network comprises a wireless communication network 110, which includes a mobile communication device and a location provider service. In this example, the user subscribes to the location provider service such as Google Latitude. The agent's subscriber in this context refers to the provider's agent such as a physician.

Also included in the communication network is the personal service network 120, whereby the users subscribe to services such as social networking services, personal information management systems such as calendars, and communication services such as emails. This service network is not limited to personal services, but also encompasses any form of services network such as a social business network that allows authenticated platforms to access its information, such as management of services in the context of this present invention.

Another exemplary configuration of this communication network includes an application device network 130, such as sensors and measurement devices that the users employ for its application or service.

This exemplary configuration illustrates the means of collecting a user's characteristics and profile through its communication network channels and services, and is not limited to the types illustrated in this embodiment. It also provides association between a plurality of users, such as their relations, contact, timing and location.

At the heart of the communication network is platform 140, which manages the matching of the plurality of users' characteristics, requirements through context aware techniques and caters for the changes in the time variant and characteristics variant of the users to the actualization of the event. In this example, the subscriber to the location provider authenticates the platform 140 to access the users' information for the secure and private use of the platform to manage the services in the current invention. Specifically, it enables the platform 140 to retrieve location base information and other services or devices information of the users and enables context aware aggregation together with other exemplary services such as the personal service network 120. The platform 140 also processes and enables location base services through the location base information retrieved, enabling real time location detection and auto registration and departure notification of the user when they arrive at the event location. The arrival and departure information may be make available to the application layer dashboard of the provider or consumer anonymously. In one illustrative example; the anonymous arrival, arriving time, departure can be used to inform users of the real time cycle time and queue information, as well as intervention strategies to induce users' actions to maximize the utilization of both providers' and consumers' time, and minimize wait time.

The devices can be in the form of mobile communication devices with sensors such as GPS, WI-FI, accelerometer and the like that allow the collection of user's statistics.

Figure 2:
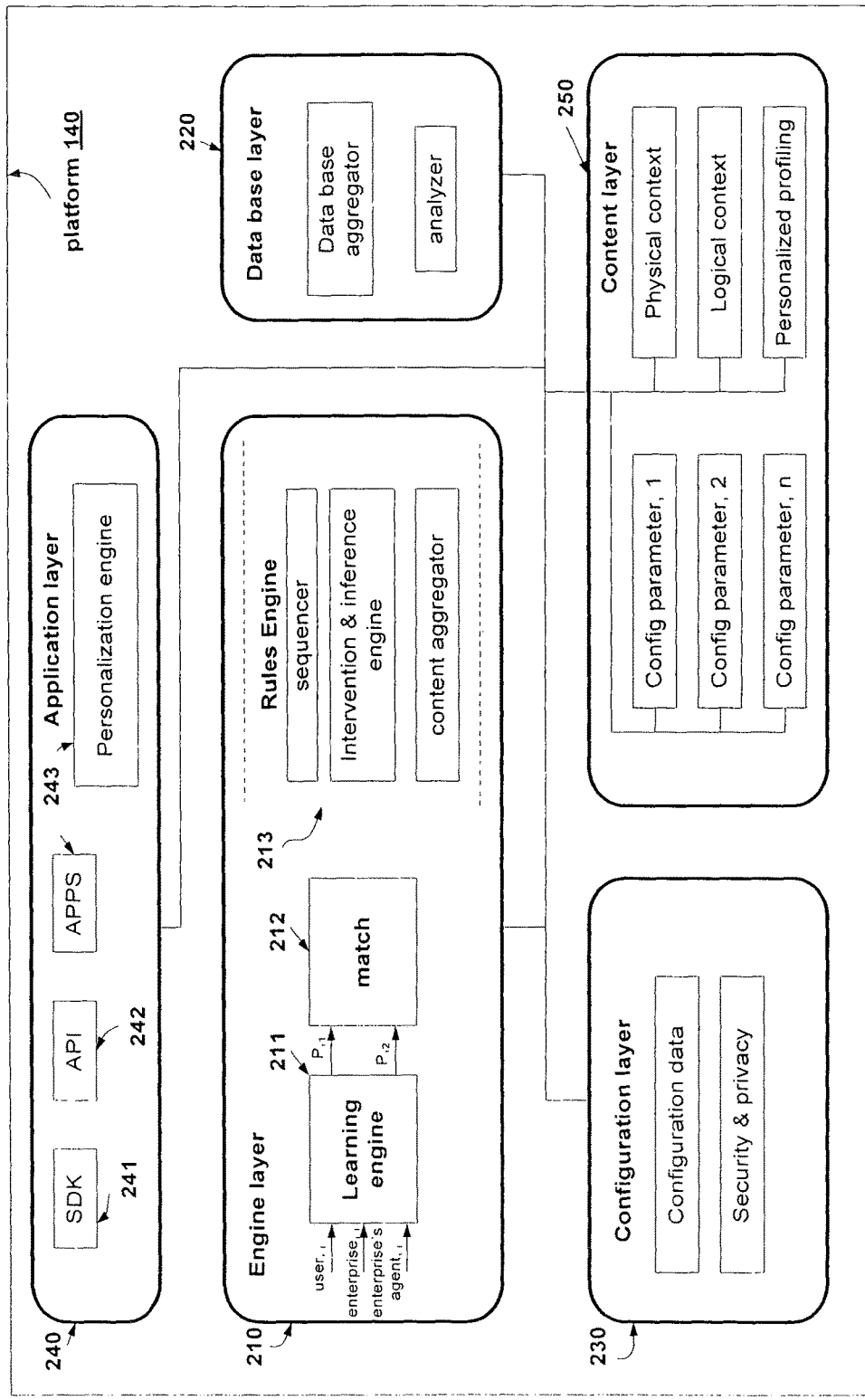
FIG. 2 illustrates an exemplary platform that contains the content layer, database layer, engine layer, configuration layer and application layer in an illustrative embodiment of the invention.

FIG. 2 depicts an illustration 200 of a simplistic platform 140 that interfaces with the content layer 250 that collects the data, with a database layer 220 that connects to the engine module 210, and with the application layer 240 and the configuration layer 230 via a data bus 205. It should be understood that the platform 140 is not limited to the exemplary layers in the illustration.

The database layer 220 collects and aggregates data collected from the personal service network 120 and the application device network 130 such as from the location base service, providing the user's statistics of location, which is indexed to the data base layer 220 with the time, day and month of the year. The database layer 220 connects to the engine module layer 210, with exemplary sub modules of a learning engine 211, matching engine 212 and rules engine 213.

The configuration layer 230 allows the user to configure data and has the option to initialize the learning module or authenticate the access of the user's personal services and configure third party guardian user. In the context of the provider, the configuration serves to enable creation of the provider's parameters and data for the management of the actualization of the events. In this exemplary scenario, the provider's parameters in the health care can be cycle time, appointment slots, consumer's profile, attributes, and provider's category.

In another aspect, the configuration layer allows the users to authorize third party configuration to upload personalized and customized profiles such as voice, video, images that could serve as alerts, notification, reminder and motivation etc which the user could identify with, and maximize the impact of such an event from the platform. The user has the option of enabling the above-mentioned personalized upload, disable it or delete it from its profile.

The application layer 240 comprises system development kit 241, application programming interface 242 and applications 243 such as the personalization engine that is customized to the user's characteristics and requirements, or extension to the other applications from the benefits of the user of the platform's engine and data. The application programming interface 242 allows secure and authenticated access of the data. The system development kit 241 allows extension of the platform's concept and algorithm to be deployed in other users' systems.

An exemplary architecture of the engine layer 210 illustrates sub components such as the learning engine 211 and the rules engine 212. The learning engine 211 is described in detail in FIG. 3. The rules engine 213 comprises an intervention and inference engine which detects unexpected traits that allows devising of intervention strategies. It includes rules of sequences of events or traits, and the rules engine 213 would match the observed data to undertake intervention. In an illustrative embodiment, the rules engine 213 detects deviation of the departure time to the appointment location, from its estimated time, and devises an intervention protocol, together with its knowledge from the aggregator database, such as a last minute calendar event of meeting, to obtain a response or recommend an alternative time. With the provision of the window of intervention, it allows the compensation and adaptation to take place from others users of similar characteristics, location and time or likely to replace the slot vacated, in a personalized delivery to these relevant users. In another illustrative embodiment, it serves as an alert to the user to depart at the window of time required, from its estimated arrival time. In another illustrative embodiment, the deviation of the estimated time from the health provider, who is expected to travel back to the consultation office from a visiting hospital, enabling provisioning of the alert and recommendation of the next appropriate time for the health care consumer whom is on the way to the consultation office for the booked appointment. If the health care consumer has a calendar event that requires her to visit the grocery store next to the consultation clinic after the appointment, the rules engine may devise recommendation and intervention strategies based on the observed data, to swap the event, maximizing contextual flow and minimizing loss time.

The content layer 250 collects data from the personal services network or device application network such as physical context, logical context, personalization, measurements data or sensors data. The physical context refers to the physical data from the context aware such as location, time, day, month, year, traffic, weather etc. One embodiment of logical data refers to non-physical context aware data, such as social networking conversations, calendar events, emails etc. Personalization could be in the path that the user has taken such as viewing or searching certain categories of providers and their availability.

Figure 3:
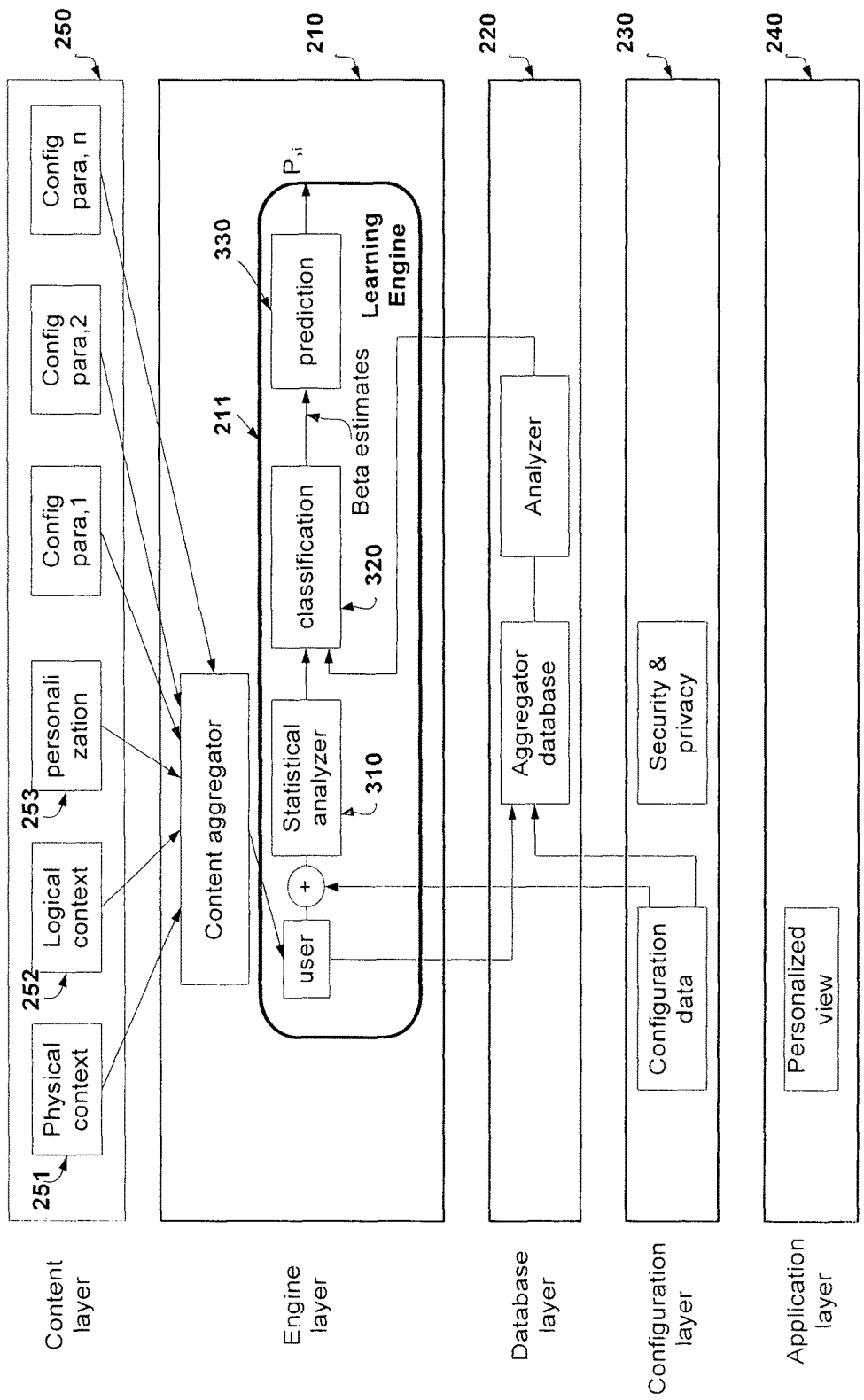
FIG. 3 illustrates an exemplary architecture in the learning engine according to one embodiment of the present invention.

FIG. 3 illustrates an example 300 of the learning engine in association with the other layers. A statistical analyzer 310 processes the data collected from the content layer 250. The statistical analyzer 310 determines if the data in the user's training module is sufficient in terms of the size, frequency and spread to make realistic classifications. The learning engine 211 performs training and can be in the form of machine learning algorithms such as classifications using support vector machines or logistic regression, to name a few.

The statistical analyzer 310 would then determine from the size and spread of the user's data the probability of error in the estimation. It may get data from the aggregator database that correlates to the user's characteristic to extend the size and spread of the training data in order to make a realistic classification. In this embodiment, the logistic regression classifier 320 is used to estimate the coefficients, beta estimates.

The coefficient estimates are input into the current data to make a prediction 330 of the user's characteristic. The matching algorithm would then determine the best correlation between the plurality of the consumer and providers to make a list of recommendations that best cater to both the consumer and provider's characteristics and availability.

The consumer and provider have the option to input configuration data through the configuration layer 210 to the learning algorithm that speeds up the process of training.

In the event that the algorithm determines that the size and spectrum of the data is not sufficient to make a good estimate, it would determine its probability of error based on a function of the size of the data and the frequency of the events over the range of the period.

Figure 4:
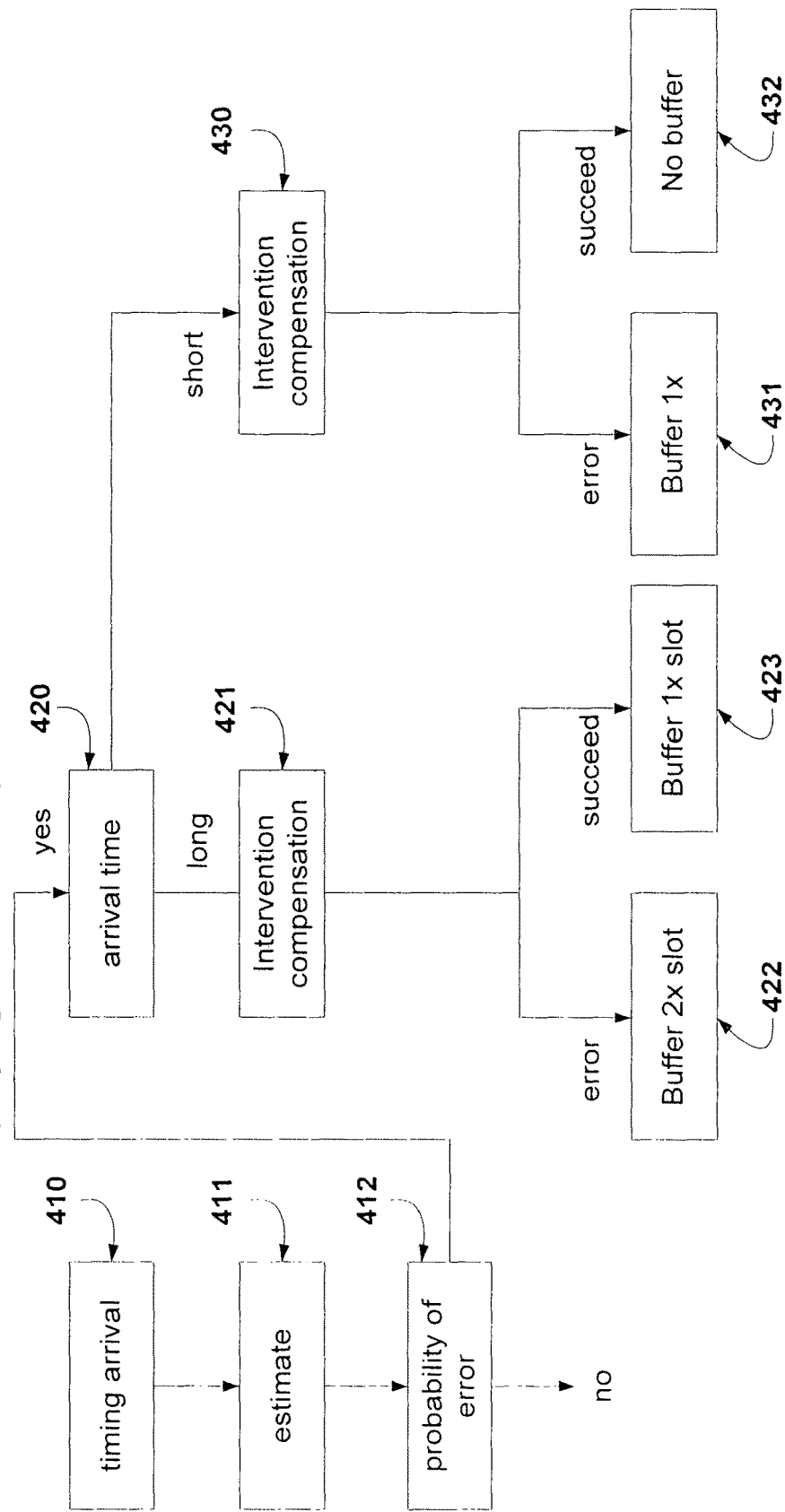
FIG. 4 illustrates an exemplary flow chart of the algorithm in adaptation and compensation in the context of the consumer in an illustrative embodiment of the invention.

With the estimated probability, the flow chart in FIG. 4 illustrates the flow to compensate errors should they occur. The exemplary illustration shows how the compensation could be made in one embodiment.

FIG. 4 illustrates a flowchart 400 for determining the estimated arrival time 410, 411 from the learning algorithm, with its probability of error 412. The probability in this case, is derived from the spectrum of the data and size of the data collected that the training engine would deem a likelihood of occurrence. To compensate for the estimation error 412, the algorithm determines if the estimated arrival time 420 exceeds a certain threshold that it would be deemed a long arrival time or a short arrival time. If the amount in the arrival time is deemed to be a long arrival time, it would follow the intervention compensation path 421. The probability of success of intervention is through a replacement of other users that are most likely to use the service and be available to arrive at the estimated timing for the replacement of the appointment slot. If the intervention succeeds, which could be estimated from aggregated database of its users, the algorithm would buffer the appointment slot one time 423 of the slot cycle time in this exemplary illustration. If the intervention results in error, the algorithm would buffer the appointment slot two times 422 of the slot cycle time in this exemplary illustration. For this exemplary scenario, the amount of compensation in terms of buffering is in the function of slot time, arrival time and characteristics of the user and provider. In this exemplary illustration, the estimation of the intervention being successful allows the slot to be replaced by the users in the system given the window of arrival time, and the probability of no-show is estimated to be higher for long arrival time. For the estimation of the intervention being in error, it account for two slot buffer as the first replaced slot may result in no-show.

For the case when the threshold determines the arrival time is short 430, the path of intervention succeeds would result in no buffering 432, that is, no action done. For the path of intervention resulting in error, there would be one time slot appointment buffer of the cycle time in this exemplary illustration.

Figure 5:
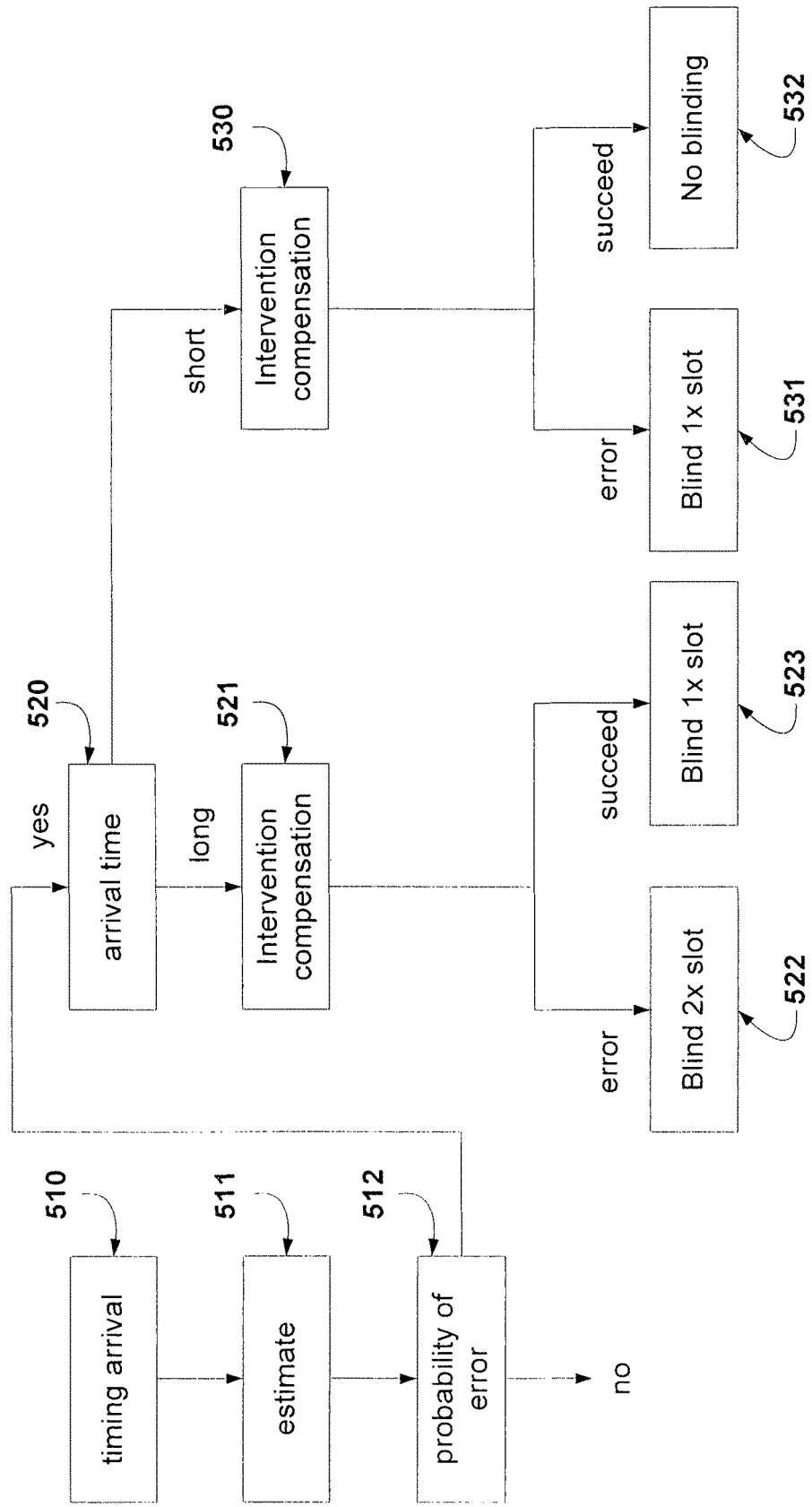
FIG. 5 illustrates an exemplary flow chart of the algorithm in adaptation and compensation in the context of the provider in an illustrative embodiment of the invention.

FIG. 5 illustrates a flowchart 500 of determination of the estimated arrival time 510, 511 in the context of the health care provider's agent, e.g., a physician, that travels from a different location such as a visiting hospital to the consultation clinic. The estimated arrival is determined from the learning algorithm, with its probability of error 512. The probability in this case, is derived from the spectrum of the data and size of the data collected that the training engine would deem a likelihood of occurrence. To compensate for the estimation error 512, the algorithm determines if the estimated arrival time 520 exceeds a certain threshold such that it would be deemed a long arrival time or a short arrival time. If the amount in the arrival time is deemed to be a long arrival time, it would follow the intervention compensation path in 521.

The probability of success of intervention is the probability of getting a consumer to replace its contextual flow in view of the delay in the appointment time, resulting in minimum or no wait time for the consumer to actualize the appointment.

If the intervention succeeds, which could be estimated from the aggregated databases of the users, the algorithm would blind the appointment slot one time 523 of the slot cycle time in this exemplary illustration. If the intervention results in error, the algorithm would blind the appointment slot two times 522 the slot cycle time in this exemplary illustration. Blinding of the subsequent appointment slots reduces backlog delay.

For the case when the threshold determines the arrival time is short 530, the path of intervention success would result in no blinding 532, that is, no action done. For the path of intervention resulting in error, there would be one time slot appointment blinding 531 of the cycle time in this exemplary illustration.

In summary, the illustrative embodiment above shows how the compensation can be applied uniquely based on the characteristics of the users and providers to minimize any loss time and maximize utilization.

One skilled in the art will recognize that the above embodiments in FIG. 4 and FIG. 5 are not limited to the mentioned parameters, but to any parameters or attributes that could influence the actualization of the event. Moreover, one skilled in the art will recognize that the illustrative embodiment only shows one manner whereby the compensation can work, and is not restricted to the above mentioned.

One skilled in the art will recognize that the illustrated embodiment is a means to show the real time adaptation and compensation that could be uniquely applied to the individual characteristics from the training and estimation algorithm, provides coalition in matching and actualization of the event through estimated data and compensation and real time adaptation. This is performed together with the rules engine to devise intervention strategies to cater for the real time adaptation and maximization of the contextual flow of users with maximum utilization and minimum loss time for all actors in the system.

The following illustrates the above in one embodiment where the actors of the exemplary system, are in health care services. The actors illustrated are the health care consumers, health care providers, and health care providers system. The consumer in this context is a subscriber to the platform, authenticating the location base service used in this platform. The subscriber to the platform can in the form of automatic detection of the subscriber's activities, or in this context, through an authenticated protocol to authorize the location provider service and its personal service network used in this platform.

The actors' activity profile from the context aware techniques may be used to predict activity, symptom and probability of actualization of the event as well as the timing arrival likely for the user. For example, the user being the health care consumer in this case, would have the most probable symptom from its historical data derived or from its activity profile or with other users having similar characteristics, or its relations, contacts through associations or sensors from the devices connected to the platform.

The training algorithm would then derive the estimate symptom with its probability. The probability in this case, is derived from the spectrum of the data; size of the data collected that the training engine would deem a likelihood of occurrence. To compensate for the estimation error, in the case of real time adaptation, FIG. 4 illustrates a flow of the events and compensation in terms of probability of success. Such probability of success could be in the form of estimation of the arrival time, the probability of success of intervention through a replacement of other users that are most likely to use the service and be available to arrive at the estimated timing for the replacement of the appointment slot.

With the estimation, the platform pushes the available health care provider's appointment to the consumers that are likely to use such service at such an appointment time that is relevant to the user, and the user is most likely to take it, and actualize the appointment with minimum error for compensation. In one embodiment, this can be in the form of personalized delivery showing the relevant appointments slots for the required symptom in the location that user would be most probable to take, in the personalization view in 243. On the health care provider's end, in one embodiment, the personalization view can be in the form of a platform allocation for the appointment slot time (cycle time), buffering or blinding of the slot, which caters uniquely to the characteristics of the consumer that has booked the appointment with real time updates that caters for the variability on the view. It can be in the form of the manner healthcare providers would receive real time updates on the status (such as arriving) of the consumer who has booked the appointment, or potential appointment slots that are released to other users.

Figure 6:
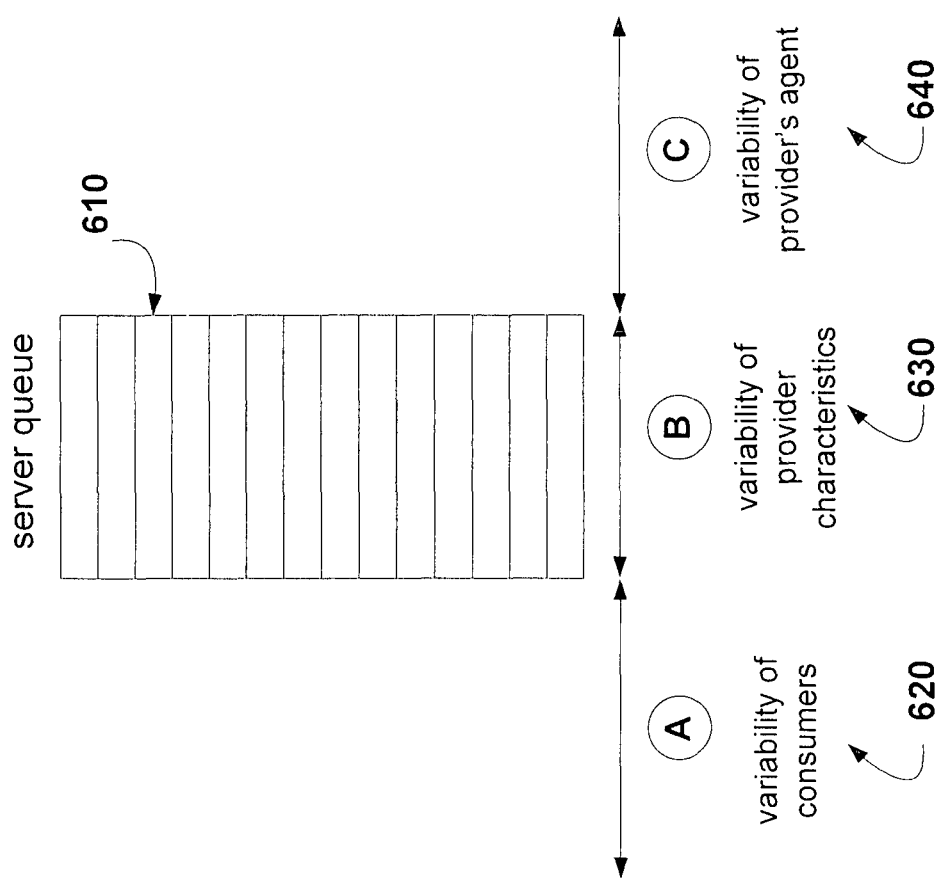
FIG. 6 illustrates a exemplary overview of the factors that contributes to matching the users requirements and characteristics in the time variant and characteristics variant trajectory in a consumer, provider relationship of a single queue server.

In one aspect, the present invention relates to matching the users' requirements and characteristics in the time variant and characteristics of the actors, the actors being the consumer, provider, and provider's agent, and provider's server characteristics. FIG. 6 illustrates an overview of the factors that contribute to matching the users' requirements and characteristics in the time variant and characteristics' variant trajectory in a consumer-provider relationship of a single queue server.

Figure 7:
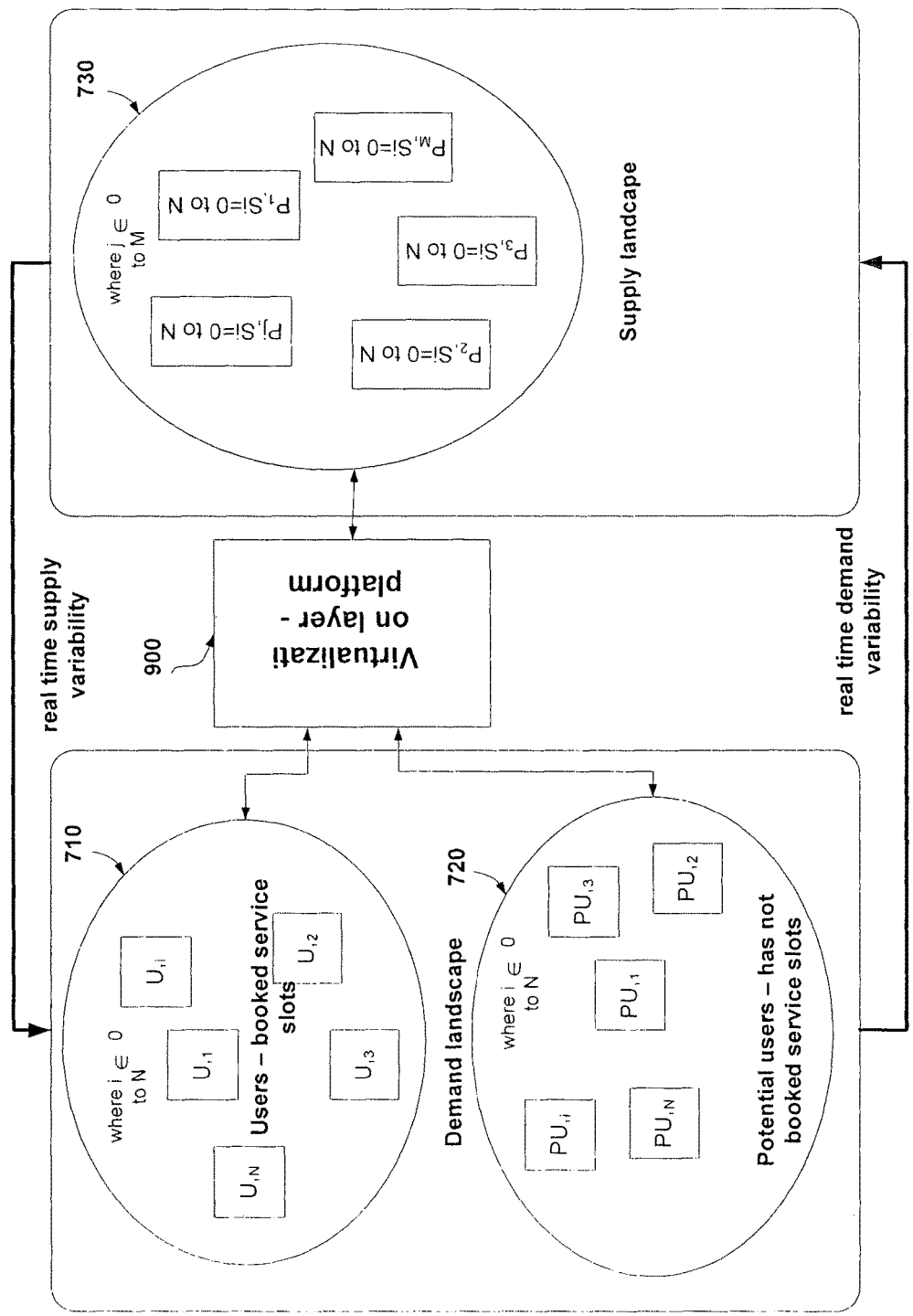
FIG. 7 illustrates the exemplary function of the platform, the platform 900 being the virtualization layer, in matching and balancing the real time demand and supply.

FIG. 7 illustrates the exemplary function of the platform, the platform 900 being the virtualization layer, in interaction, matched and synchronized to the actors' requirements and characteristics in the real time demand and supply balancing. 710 refers to users 0 to N that have booked the slot 0 to N in multiple server queues within or outside the provider 730 from provider queue 0 to M. 720 refers to potential consumers in the system that may likely take slot 0 to N, but have not booked the slots 0 to N. N refers to the maximum slots in the single queue server, and M refers to the maximum server queue.

Figure 8:
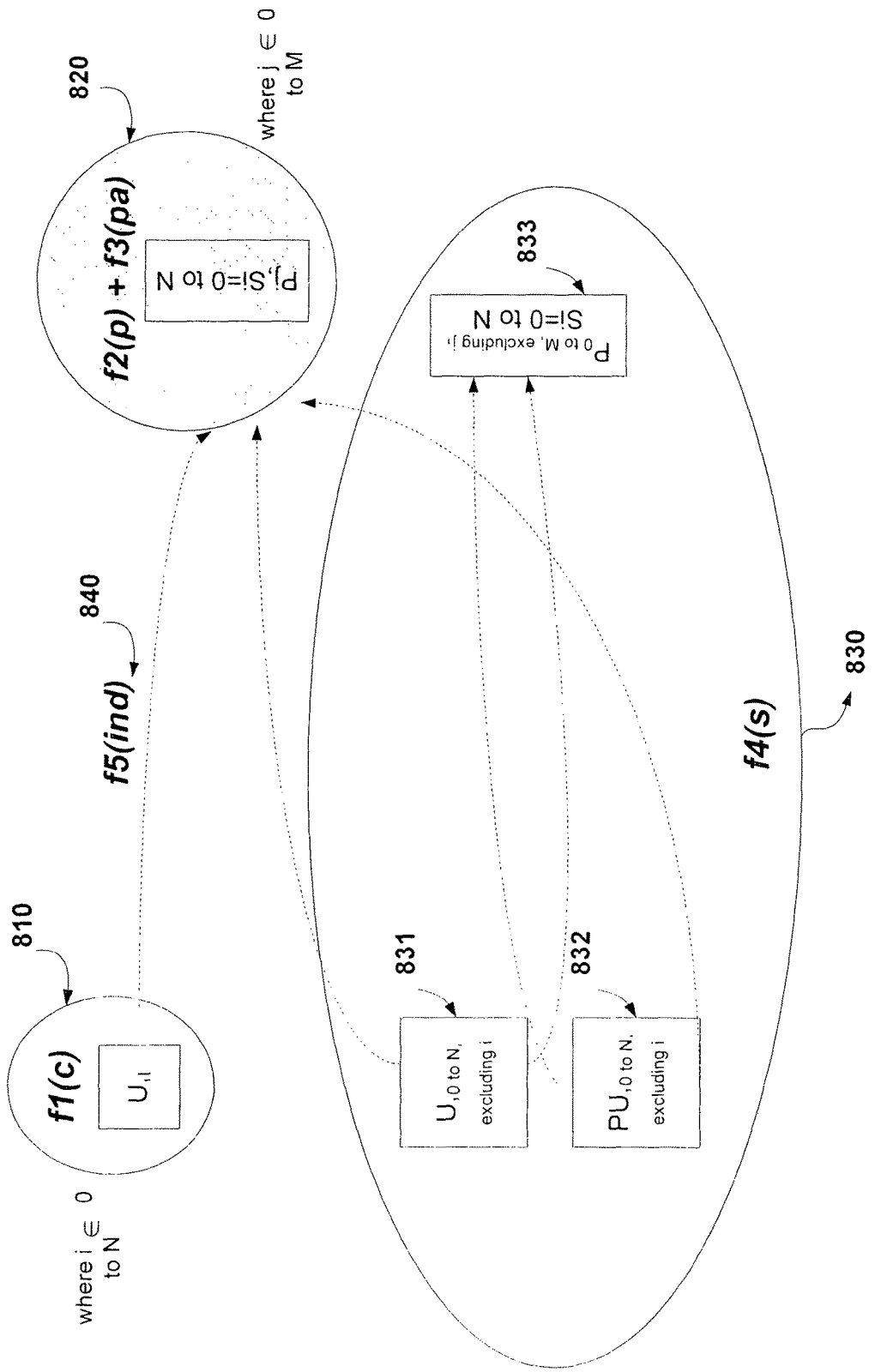
FIG. 8 illustrates the exemplary functions in the platform system that is used to maximize the consumers and providers utilization, time and minimize wait time.

FIG. 8 illustrates the functions in the platform system that are used to maximize the consumers' and providers' utilization and time and minimize wait time.

In one embodiment, a system and method with the relationship below is employed by the platform:

$$f(u,s)=f1(c)+f2(p)+f3(\text{pa})+f4(s)+f5(\text{ind}) \quad (1)$$

wherein u denotes the user that has booked the slot, s denotes the users in the systems (users being both consumers and providers), and $f(u, s)$ denotes the function of u and s. In one embodiment, the $f(u,s)$ may refer to the estimate, weight or the probability of the slot being actualized. Also, c denotes the consumer that has booked the slot, I; p denotes the provider with characteristics for queue related to slot, I such as cycle time; pa denotes the provider agent with such characteristics for queue related to slot I, such as start time; and ind denotes the inducing factor of such methods that induce user's action to decrease the error rate of actualization of the service.

The following illustrates the components with reference to the function, whereby the function may employ any methods such as statistical methods, or any techniques such as classification methods like multi-class classification to deduce the best estimate at each time state for the maximum utilization of users.

$$f1(c)=f(ic,\beta c) \quad (2)$$

wherein the ic relates the user's information to the time slot I and βc relates to the parameters for ic.

$$f2(p)=f(ip,\beta p) \quad (3)$$

wherein ip relates the provider's characteristics with respect to the time slot I and βp relates to the parameters for ip.

$$f3(pa)=f(ipa,\beta pa) \quad (4)$$

wherein ipa relates the provider's agent characteristics with respect to the time slot I and βpa relates to the parameters for ipa.

$$f4(s)=f(is,\beta s) \quad (5)$$

wherein is relates to the system users characteristics with respect to the time and βs relates to the parameters for is.

The system users' characteristics may include users who have booked a time slot from 0 to N, other than slot I, and potential users whom may be likely to actualize the service from 0 to N, but have not booked any time slots. Another form of system users' characteristics includes the multiple queue servers within or outside the single provider queue for slot I, such as those under the preferred users provider or not.

$$f5(\text{ind})=f(i\text{ind},\beta\text{ind}) \quad (6)$$

wherein the iind relates the inducing factor information with respect to the time slot I and βind relates to the parameters for iind.

The inducing factor refers to methods that induce or influence the user action towards decrease rate of error to the utilization of the slots, such as provider's and consumer's utilization. The methods may include intervention strategies, visibility of real time information of the current time to booked service slot, loss of slot if the window of arrival fails, the real time provider, and consumer characteristics limit. It may also include real time wait time, and next available slot(s) should the booked slot arrival time fail. The inducing factor includes all methods that relates to actions that actualize or release the appropriate service time slot in a timely manner that leads to a decrease in the rate of error of the utilization of the slot, and both consumer and provider time, as well as wait time. Other methods include reward programs that encourage the timely actualization or release of the service time slot based on the system computation and information to the users.

Equation 1 is an exemplary function that is meant to illustrate the components in the platform system that maximize the consumers' and providers' utilization and time and minimize wait time. One skilled in the art will recognize that it is not limited to the above examples and may include all components of the function that maximize the match, utilization and time and minimize wait time in accordance with the users' characteristics in time variant and characteristic's variant trajectory.

Figure 9:
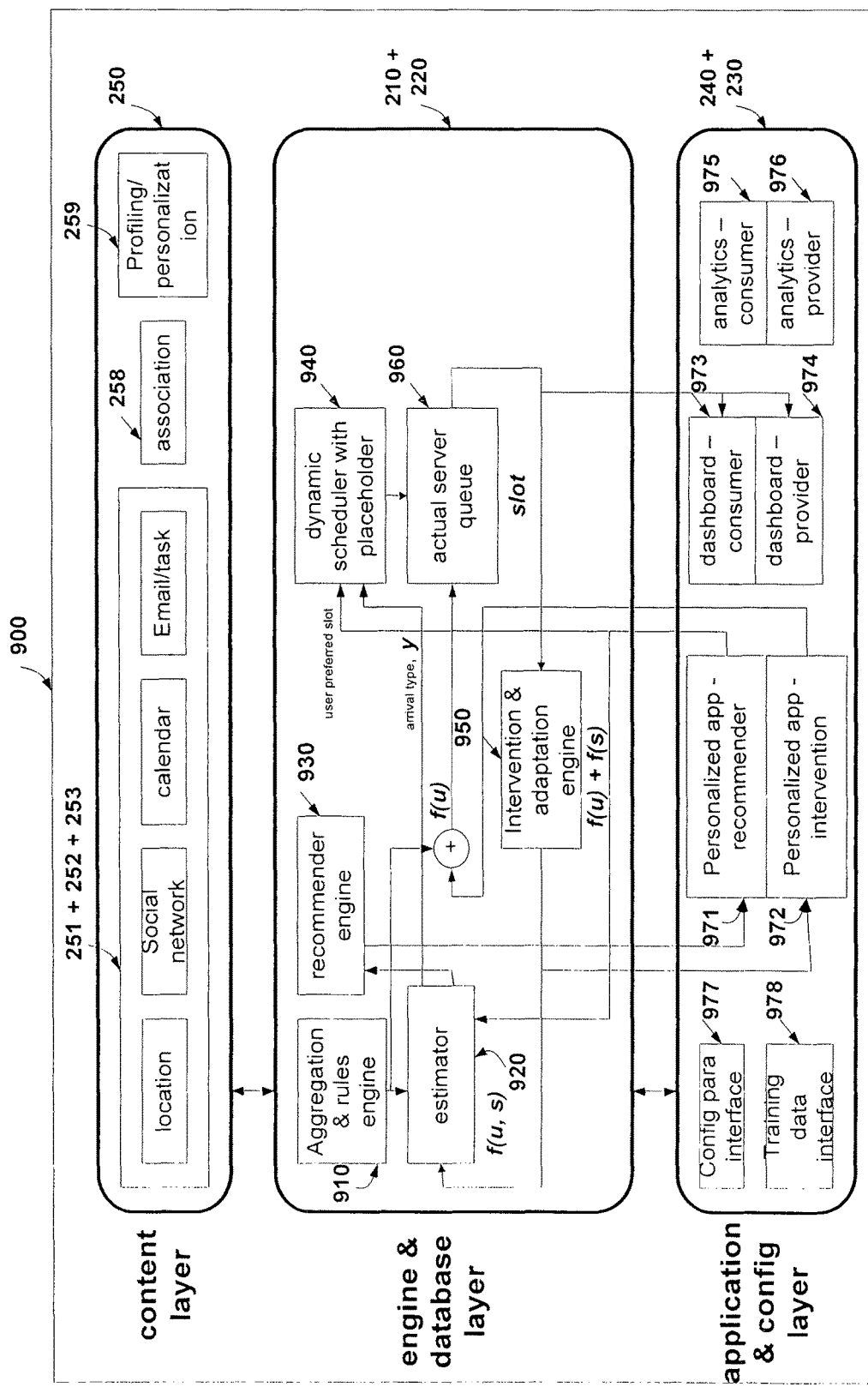
FIG. 9 illustrates another embodiment 900 of platform 140, with exemplary self-adapt architecture in one embodiment of the present invention.

FIG. 9 illustrates another embodiment 900 of platform 140 with the engine and database layer in association with other layers. The exemplary architecture of the platform illustrates a general application whereby the requirements and matching to the actualization of the service between the consumer and provider maximizes utilization of the actors in the system. In one embodiment, the platform illustrates the employment of the functions in FIG. 6, FIG. 7 and FIG. 8. It shall be noted that platform 900 includes all the embodiments that are described in FIGS. 1, 2, 3, 4, and 5.

The content layer 250 gathers data from the personal service network 120 and/or the application device network 130. Examples of the data from the personal service network 120 include location information with or without continuous background tracking, social network, calendar, email and task. Association 258 may be in the form of co-workers, family, or people that are connected in a network, place, and family that may yield association to the data, such as discovery of needs. It should be noted that the data in content layer 250, engine and database layers 210, 220, as well as application and configuration layers 240, 230 may include any methods that involve the protection of the security and privacy of the users, and methods to have user control of individual database or information, and anonymous data to or for the processing and computation as illustrated in the functions of the embodiments.

The data from 250 goes to the aggregation and rules engine 910, which performs reasoning. This data works in conjunction with the data collected from 240, with the estimator 920, recommender engine 930, dynamic scheduler with placeholder 940, intervention and adaptation engine 950 to the final server queue. The follow section describes the components in detail.

The Estimator 920

The estimator 920 works with data from the aggregation and rules engine, intervention and adaption engine, application layer 240 and its master matrix database.

In one embodiment, the estimator 920 provides an estimate of the user arrival time and service start time to the actualization of the service. The estimate is a function of the user's characteristics and system users' characteristics for the service slots.

$$f(u,s)=f(u)+f(s) \quad (7)$$

wherein s refers to the system users' information with exemplary parameters such as the number of users (providers, consumers) in the system; the number of users with preference, profile such as providers, location, time, need; the number of users with preference, profile such as providers, location, time, need, that has not booked the service time; and wherein u refers to user's specific information exemplary parameters such as user specific target characteristics of the estimated arrival time from the service time such as that generated from statistical methods such as the multi-class classification and user specific cycle time or last end service (real time) of the queue server of the intended service of the provider. Examples of the system parameters may be obtained from the historical data of the specific user, or from the pool of users, or the estimator with known or unknown user's historical data. In one embodiment, an exemplary illustration of Equation 7 with Equation 1 is as follows:

$$f(u)=f1(c) \quad (14)$$

$$f(s)=f2(p)+f3(pa)+f4(s)+f5(\text{ind}) \quad (15)$$

Equation 7 is an exemplary function that is meant to illustrate the relationship between the system users' information and the specific user information to provide the estimate of the arrival type for the dynamic scheduler. The goal is to account for the user's specific traits for the intended service time slot i, with the system users information. System users information such as the consumers that have booked other slots in the same or different server queue, the provider's characteristics and potential users through the discovery of need service that may need the service slots but have not made the booking. In essence, it accounts for the individual characteristics of the intended service time slot i, with the supply and demand landscape characteristics. The supply and demand landscape is taken with respect to all times such as service time slot 0 to N, where N is the maximum time slot in the user's server queue slot i, and other queue servers 0 to M, where M is the maximum server queues. The maximum server queues M may or may not include information that is in the user's preference. In one embodiment, Equation 7 with Equation 14 and Equation 15 refers to the dynamic landscape 922 in FIG. 10A.

In essence, Equation 7 illustrates the use of user's specific characteristics to the booked service slot i, with the system users' characteristics for the estimation. This devise compensation, with respect to the specific slot i, is taken to the dynamic scheduler and placeholder for optimization of the slots, with minimum wait time, maximum user's utilization and slot utilization. In one embodiment, the compensation may incorporate the form described in FIG. 4 and FIG. 5.

The function in Equation 7 includes the time variant information that may be updated in real time through any method such as the system computation of the updates with respect to Equation 1.

One skilled in the art will recognize that the system users information and specific user information may include any form of parameters that influences the user's probability of actualization of the service slot.

In one embodiment, the estimator generates the arrival type characteristics that may be used for the dynamic scheduling placeholder structure described in the later section.

$$f(u,s)=\gamma \quad (8)$$

wherein $\gamma \in (-1|0|1|+1)$ and $-1$ refers to one slot time earlier than arrival with reference to the intended service time, 1 refers to on-time user arrival with reference to the intended service time, +1 refers to one slot time later than arrival with reference to the intended service time, and 0 refers to no-show with reference to the intended service time.

Equation 8 is an exemplary function that is meant to illustrate the relationship of the estimator input of system users' information and specific user information to the estimation of the arrival time characteristics to the intended service time. This arrival type characteristic serves as an indication to the dynamic scheduler that works with the placeholder structure that illustrates the user's arrival characteristics to the intended service time, for computation of the optimization of the utilization of the provider and consumer time as well as minimum consumer wait time. The arrival type characteristics may take any form that relates to the dynamic scheduler optimization. Equation 8 only illustrates the indicator with respect to one time slot in one embodiment.

In an exemplary illustration, the user of the intended service has an estimated cycle time of twice that of the typical slot time, with an arrival type estimated as late. The estimate of the arrival type characteristics for this user would be +1, 1, taking 2 slot times of the service queue.

In an exemplary illustration, the user of the intended service has an estimated arrival type of 0, indicating a probability of no-show based on the specific user's parameter, $U_i$ 1020 as in Equation 14 and $S_i$ 1020 as in Equation 15. In this case, the dynamic scheduler with placeholder may place this slot i to another user at the same time, double buffering the slot i, as a means of compensation for no-show at the time of booking.

One skilled in the art will recognize that Equation 8 includes any form of parameters that could be used to indicate to the dynamic scheduler 940 the arrival characteristic of the user for the intended service incorporating computation methods that optimizes the utilization of the service time slots and minimizes wait time of the provider and consumer. Such parameters may account compensation methods in view of the user's characteristics with the systems users' characteristics which provision for self-adaptation in the actualization of the service.

The Estimator 920—Extraction of a User's Profile

In one embodiment, the estimator 920 for the user's traits, such as the user's arrival time, can achieve service time start with no historical information of the user or users in the system, through the supervised learning method. Instead of getting users to enter a list lengthy personal profile or information which may deter user's adoption and accuracy, especially for those unfamiliar with information space, the system extracts the user's traits such as arrival type and service start time with just a few user's configuration. The system would then self-adapt and learn the parameters with the platform architecture 900 while the user traverses the time space to the actualization of service, with no prior historical information of the user.

Figure 10A:
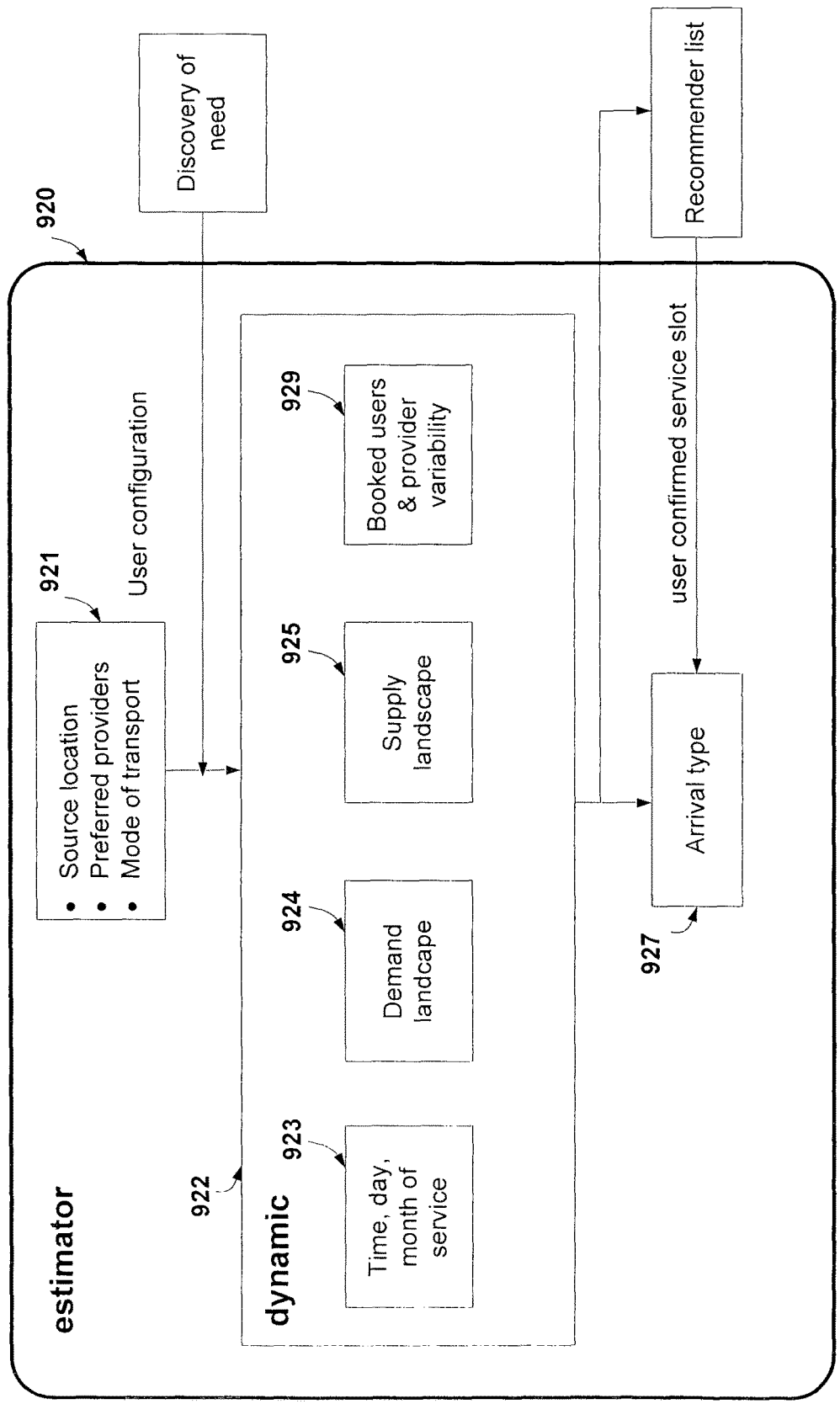
FIG. 10A illustrates the exemplary flow in estimator with minimum user's configured input, and using the dynamic information in the system to generate the estimated realizable recommender list and user arrival type information.

In an exemplary illustration, FIG. 10A shows the user input 921 to the estimator 920 with the user's source locations, preferred providers, and mode of transportation. The input 921 is the configured static user's profile. In the event whereby the user's generate interest to the service through a series of configurations such as browsing the web information service slots, or extraction of the user's need of service through its personal management network 210, the recommender engine 930 makes a list of possible service slot. Upon the user's confirmation of the intended service slot through booking, the present time, and the day, time, month of the intended service 923 is captured. The estimator 920 takes reference to the master default matrix that provides the arrival time information based on the source location, destination location, mode of transport. This baseline information is added with an overhead parameter that caters to the specific time, day, month, season, weather, traffic or any other physical conditions. The estimated arrival time is derived as a function of the demand 924 and supply 925 landscape, together with the 929 booked users number and characteristics, and providers characteristics such as variability in the cycle time or start time, which could be accorded to Equation 1, $F(u,s)$. In one embodiment, this accounts for the user's arrival time with the dynamic landscape of the other users in the system, to devise embedded means of compensation to maximize the utilization of time slots. Parameters such as distance from source to destination, state of user such as activity prior to the service time, and arrival time window in Equation 9, may be used as independent variables together with the estimated arrival time, information from Equation 1, illustrated in 1020, FIG. 10C. Statistical methods such as multi class classification may be used to derive the estimate of Equation 8, incorporating the compensation in FIG. 4 and FIG. 5. The multi-class labeling may be achieved through various combinations of the threshold values in the independent variables, and generated through a master matrix 1010 as illustrated in FIG. 10B. This matrix would eventually be adapted with the user's historical data. Examples of user's data update may occur through the personal service network 120, wireless communication network 110, application service network 130 with the user's authentication, the personalized recommender application 971, personalized intervention application 972, or any form of interaction, capture or devise of the user's information.

In one embodiment, Equation 7 with Equation 14 and Equation 15 refers to the dynamic characteristics 922 in FIG. 10A. The user input 921 to the estimator 920 with the user's source locations, preferred providers, and mode of transportation refers to the static characteristics of the users.

The above embodiments introduce a mechanism whereby the estimate of the user arrival, together with the functions of the parameters in the demand, supply, existing users landscape, can be devised with embedded compensation to the dynamic scheduler. As much as the parameters provides provisions for the accuracy of the estimate, the users variability in the real time system can self-adapt together with the dynamic scheduling placeholder structure and intervention and adaptation engine.

In essence, the above embodiments provide a provision for the estimate with embedded compensation in the presence of the characteristics of the users in the system, without historical data of the users or need for lengthy user configurations. The impact of this estimate is further enhanced by the architecture of the components in platform 900.

Service Intention—The Recommender Engine 930

In one embodiment, the discovery of need of service may be obtained through statistical methods through the personal service network 120, or the like, with a user's authentication for access.

In another embodiment, the user may not have authenticated access to its personal service network 120 or the like. The user indicates the interest of the service provider by browsing through its platform.

The platform 900 captures the user's interest and computes a list of service slots with various user configured source departure location, mode of transport, state or event prior to the service time. This targeted list of service time to the user' preferred profile and characteristics are pushed to the user's, through the computer network, mobile devices, or web platform such as 971. In some embodiments, other information may be made available to the user through 973, 975 and 976. The user can place an intention of the service from the list of service time, either from a single or plurality of providers through booking the service time slot.

The recommender engine 930 would devise the list of service times based all of the users' captured information, such as the current location, state of event prior to service time, mode of transport, time, day, month of the year, weather and other physical or user's specific conditions. This captured information may be from the form of user's authentication to the context aware methods or services, or devise from the current general information of time, day, month, location, responses from users, physical environment conditions, and/or historical information of the users.

This has specific impact especially if the current time of booking and the intended service time is within a small time window such as hours or minutes to the intended service time. The system may not allow the user to book a service time that is not within the reach of the user and/or compatible with the characteristics of the provider or the provider's agents. An exemplary illustration includes the computed user's arrival time determined to be greater than the current time and the intended service time window.

$$Ai = C + Ei \quad (9)$$

where i ∈ 0 to N, and where i refers to the service slot at the specific time instance, N is maximum service slot number for a single queue server. Also, where A refers to arrival time from present time, C refers to present time, and E refers to the estimate of user arrival time from the user specific information and or from the general local users information.

$$Si \geq Ai + THi \quad (10)$$

where S refers to service time slot and TH refers to the threshold whereby the system may used to account for the tolerance, and may range from a negative, zero to a positive value. An exemplary illustration of the use of threshold, TH includes accounting for the specific user's information for that service slot, i, with the estimated cycle time or start of service time from the provider.

Equation 9 and Equation 10 are exemplary functions that are meant to illustrate the relationship of the list of service time that is realizable with the actualization of the service or event with the specific service time slot characteristics relating to the specific user conditions, user state prior to service time, local context characteristics and physical conditions.

One skilled in the art will recognize that Equation 9 and Equation 10 includes any form of parameters that could be used to indicate service times that are achievable to the consumer and provider characteristics at the specific service slot. This reduces the error rate to the intended service time that may incur through deployment of the parameters that make relevance to the actualization of the service time.

The Dynamic Scheduler with Placeholder 940

In one embodiment, the dynamic scheduler 940 illustrates a real time user preferred service time based on user's identification of the service time method. This method uses a Markov chain-like algorithm that has no memory of the prior bookings, and scheduling the service time slot real time based on the user arrival type from Equation 8. The scheduler 940 uses the estimated user's arrival type with decisions that minimize the queue in terms of slots, hence, minimize instantaneous wait time as well optimize utilization of the slots in the queue based on the user's characteristics. The scheduled slots work with the placeholder mechanism according to FIG. 11, FIG. 12, and FIG. 13 and Equation 11, Equation 12, and Equation 13 in one embodiment.

Placeholder Mechanism

One aspect of the invention relates to a placeholder mechanism that works with the dynamic scheduler 940 to infer the service time of the users at the time of booking. The placeholder structure allows users' intended service time to be placed and computed for the optimal maximization of utilization and minimization of wait time at the real time booking. In one embodiment, upon user arrival at the service slot, the variability of the user's arrival time from the intended service time in the placeholder scheduling can be determined in accordance with FIG. 11, FIG. 12, and FIG. 13 through exemplary Equation 11, Equation 12 and Equation 13.

The user's arrival sequence and its booked service time is accounted for in the priority of the consumption of the service at the service actualization time with respect to the variability of the users who have been placed for slot 0 to N, and the functions of $f(u,s)$ in Equation 1.

The placeholder mechanism allows variability between the users in the self-adaptive architecture to optimize the utilization for both the consumers and providers, while minimizing wait time.

This is performed through accounting for the characteristics of users that have been placed in slot 0 to N for queue j, and system users that have not placed a booking but may be likely to actualize the service slots 0 to N, and the plurality of provider queues from 0 to M, where j ∈ 0 to M. This may be accomplished in conjunction with the intervention and adaption engine, with the visibility of the customized user's view of the probability of the arrival time of the users in the adjacent slots and the variability window Equation 11 allows in the system. Other examples in the customized user's view through dashboard or applications includes wait time, next available slot if the user forgoes the booked slot, and the provider's reward program or points if the user released the placed slot in time for other users.

In one embodiment, the platform 900 allows the configuration of the placeholder structure 940 with the threshold value Equation 11 that determines window of arrival time between the actual arrived time and booked slot time. This may be in the form of +/−slot times. This threshold value Equation 11 is used to determine if the variability window that allows the user who has booked the time slot i, to actualize the service at the arrival slot h, $$\text{variability window, } Vw = i - k \quad (11)$$

whereby i ∈ 0 to N, and i is the user booked time slot; and whereby k ∈ 0 to N, and k is the user actual arrival time slot.

In one embodiment, the place holder structure with the dynamic scheduling 940 works with the function $f(u,s)$ Equation 7 to achieve maximum optimization of the users in the placement, users in the system that have not been placed, to the actualization of the service or event.

$$f(c,k) = wk \quad (12)$$

whereby $f(c,k)$ is the function of the consumer placed at time slot, k and wk is the weight that determines the utilization of slot k placed into user, k; and whereby k ∈ 0 to N, N being the maximum number of slots in the single queue server and k/=i and/or k<variability threshold.

$$f(s,\tilde{i}) = w\tilde{i} \quad (13)$$

where $f(s,i)$ is the function of the system consumers not placed at time slot, i. This may be consumers who have been placed in the schedule outside slot i, or consumers who are likely to actualize this slot i but have not been placed in or booked the service slot. Also, where $w\tilde{i}$ is the weight that determines the utilization of slot i from consumers not placed into user, i.

In one embodiment, Equation 12 and Equation 13 may be derived from Equation 1, where the different weights of the functions relating the $f1(c)$, $f2(p)$, $f3(pa)$, $f4(s)$, $f5(ind)$ may be used to determine variability and user's arrival sequence from its booked slot time, i.

Figure 11:
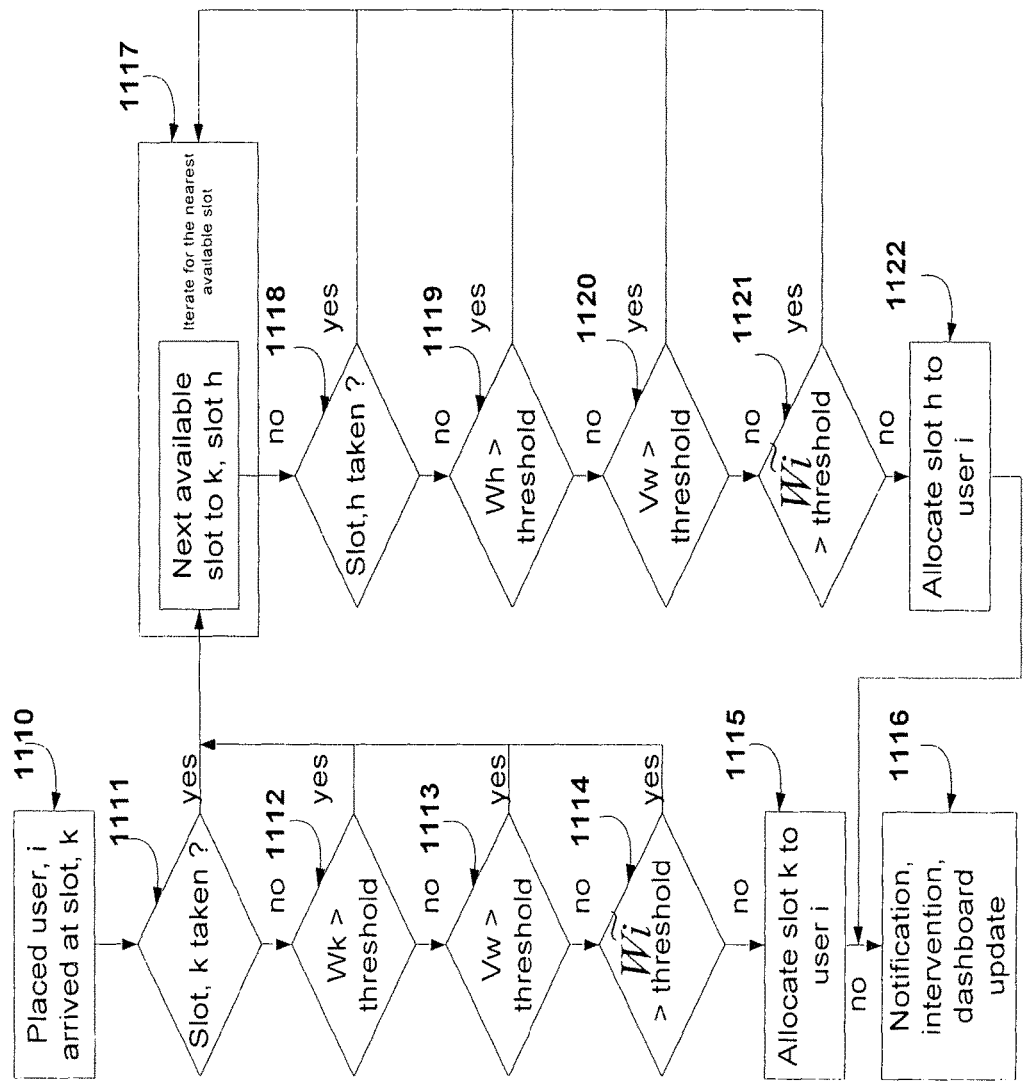
FIG. 11 illustrates the exemplary flow in placeholder with dynamic scheduler that caters for the real time variability of the users in the system in a self-adapt architecture.

FIG. 11 illustrates the placeholder mechanism in the actualization of the service slot. In this illustration, the user has been placed at service slot i, and intends to arrive at slot k 1110. The system in 940 and 950 will determine if slot k has been taken at 1111. If slot k has not been taken, it will check if the wk weight of slot k at Equation 12 exceeds a determined threshold in 1112. The threshold in this case may be a value that would indicate the probability of the placed user arrival for the slot. If the wk weight of slot k is not greater than the threshold, it will determine if Vw, the variability window in Equation 11 is within the determined limit in 1113. If Vw, the variability window is not greater than the determined limit, it will determine if w͠i in Equation 13 is within the determined limit in 1114. If this w͠i is within the determined limit, it will proceed to allocate slot k to the user who has been placed at slot i. At the same time, actual queue server 960 may make the information of the actualized slot and update of the weights and other information available to the consumer dashboard 973 and provider dashboard 974.

If all the conditions from 1111, 1112, 1113, 1114 fail, it will proceed to the next available slot, say, h. and repeat the checks in 1118, 1119, 1120, 1121. If the checks succeed in 1121, it will proceed to allocate slot h to the user who has been placed at slot i. This process may be repeated for the subsequent available slots, or determined by a configurable threshold such as iterations.

In all cases, the determined limits for the different weights in FIG. 11 may be configured or determined by the system based on the historical information.

Figure 12:
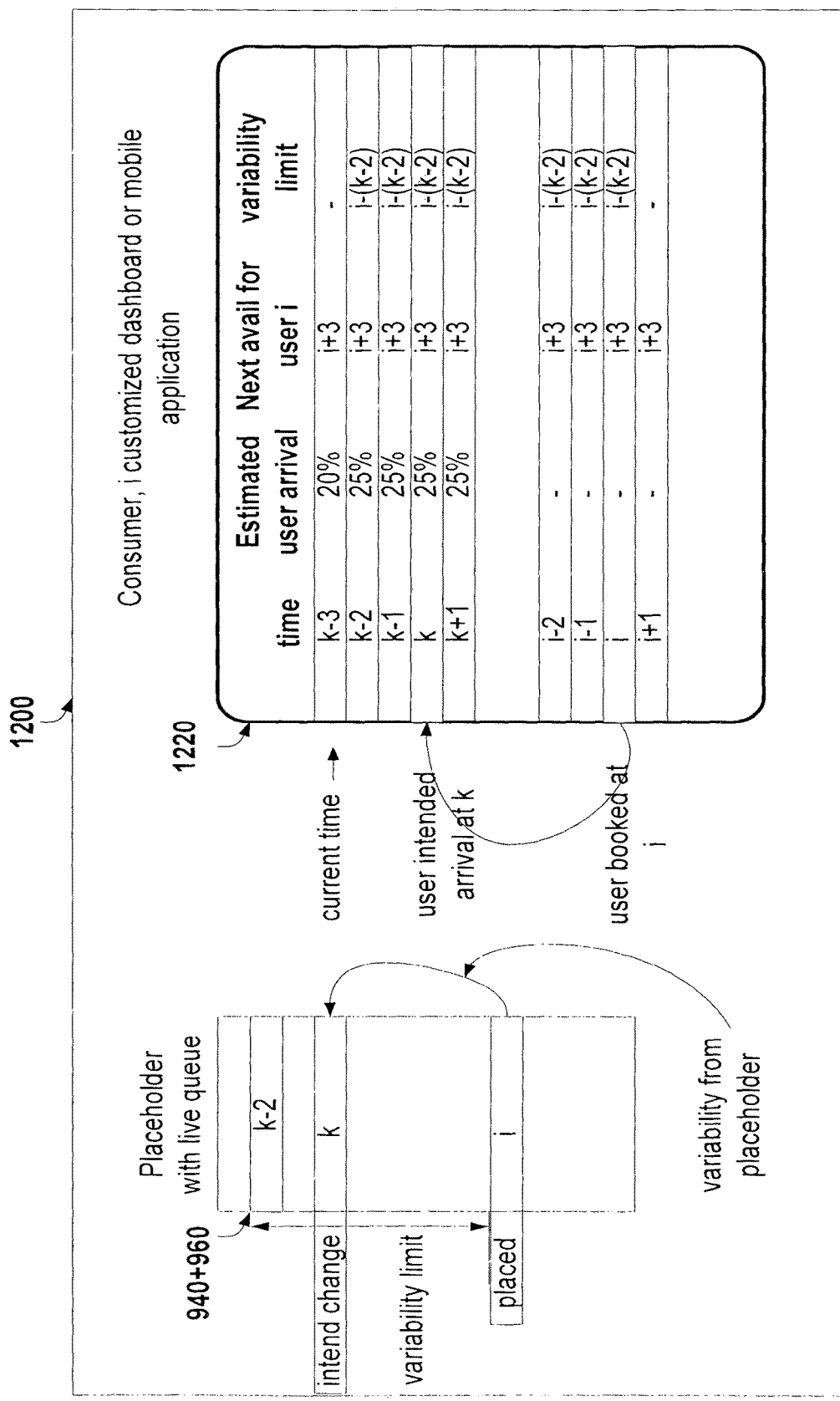
FIG. 12 illustrates the exemplary flow and customized consumer dashboard in the example of user early arrival with respect to the placed time slot.

In one embodiment, the placeholder with live queue 940 and 960 and customized consumer dashboard 1220 is illustrated in FIG. 12. FIG. 12 illustrates the early consumer arrival time with respect to the booked slot by the placeholder. Customized customer dashboard 1220 may be part of 973.

In FIG. 12, the user that booked the slot i, placed by the placeholder 940 and 960 has a last minute cancellation of event that was not accounted in the earlier estimator 920. At time slot k−3, the user foresees that she could arrive at slot k. The customized consumer dashboard, 1220, in conjunction with the 940 and 960, provides weight estimation that is used to compute an indicator such as probability of arrival of the user who has booked the slot at slot k, to arrive at slot k. In this case, the Vw in Equation 11 is −(k−2) of the user i, which slot k falls within the variability window that user i is allowed to take. The next available slot for user i, in 1220 refers to the non-booked or non placed slot that is available. The user i may chose to actualize the service slot k, as deemed within allocation window of the 940 and 960. One skilled in the art will recognize that customized dashboard 1220 may include any form of parameters that is relevant to the aid the user to make timely decision to release the placed slot, actualize the placed slot or swap the slot with other users. In another embodiment, this customized consumer dashboard 973 may be used in conjunction with the personalized recommended application 971 to get new replacements user for the vacated slots.

Figure 13:
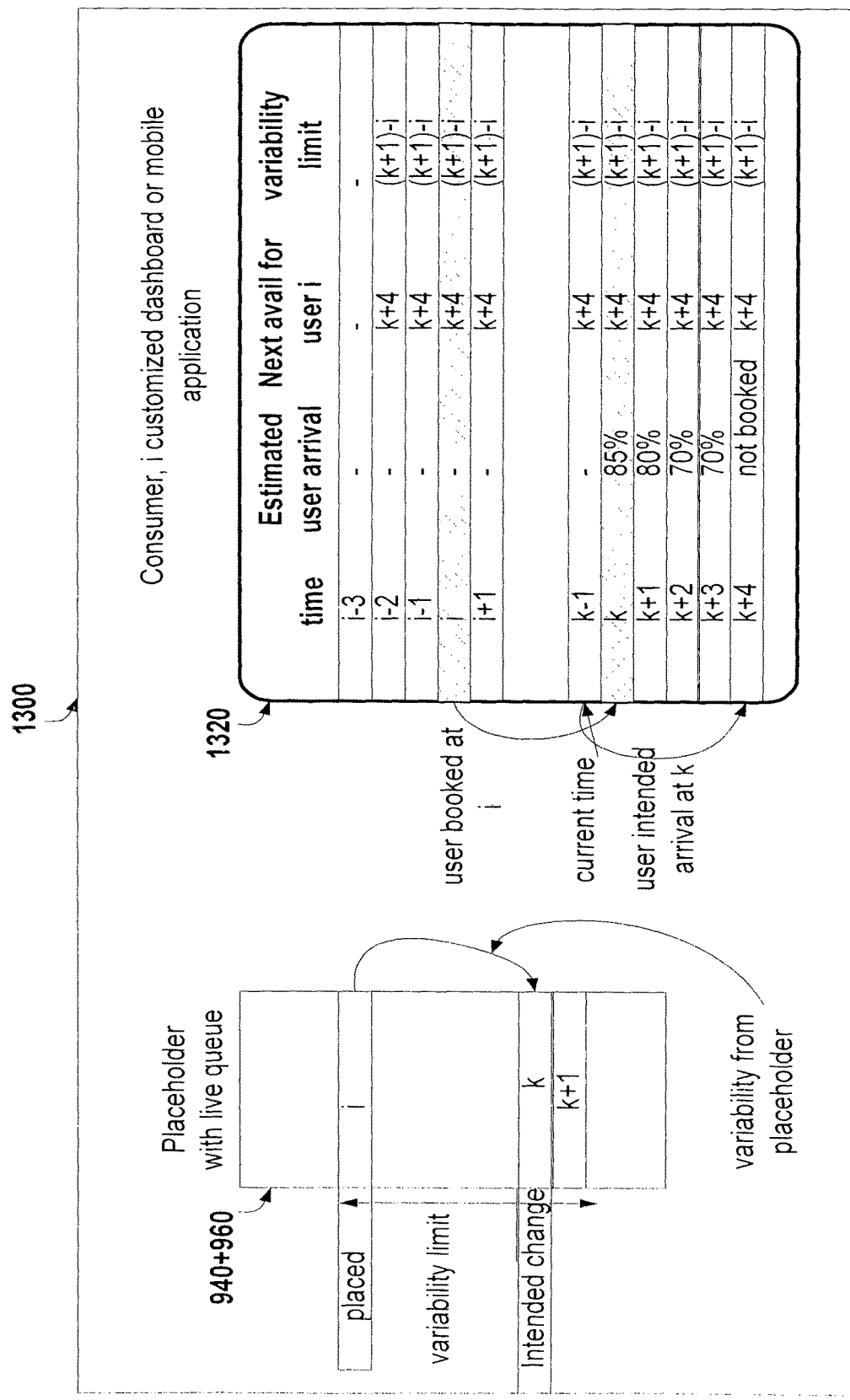
FIG. 13 illustrates the exemplary flow and customized consumer dashboard in the example of user late arrival with respect to the placed time slot.

FIG. 13 is an exemplary illustration of the user who has been booked or placed at slot i is delayed to slot k. At time k−1 1320, the user intends to actualize the service slot k. Although the Vw in Equation 11 is k+1−i) for user l, weight in slot k forbids the user i to actualize the slot k. The next available slot for user i 1320 is k+4, whereby the slot k+4 is not placed or booked. In this example, the user i may decide to run some errands until the time of slot k+4, hence, maximizing the utilization of the providers and consumers, in the system and minimizing wait time.

The above illustrations are some of the embodiments whereby the placeholder with the dynamic scheduler in the server queue, together with the functions defined in FIG. 8 and components in FIG. 9 can be used to cater for the self-adapt architecture of the platform that exploit the characteristics of the users in the system. Different variations of functions and components can be adapted to maximize the match and utilization and while minimizing wait time.

In this manner, the placeholder mechanism 940 and 960 works with the components in the platform 900 and functions in Equation 1 to maximize the match to the user's characteristics in achieving utilization of the service slots and minimizing wait time. This is accomplished without the need to incur financial penalty to the consumers who may be circumstanced by their variability. The architecture allows self-adaptation based on the users real time variables.

Online/Offline Adaptation—The Adaptation Engine 950

In one embodiment, the user may or may not have authenticated the access of its personal service network 120 or the like. The user indicates the interest of the service provider by browsing through its platform. In another embodiment, the platform captures the historical data of the user, or interest rendered from configuration, through a method such as collaborative filtering, to devise the interest of service of the user with a relevant time or day.

The platform 900 captures the user's interest and computes a list of service slots from the estimator 920 and make this available to the user in any form of communication resources, such as mobile device, mobile applications or web information or the like. The user however, does not commit to any of the booking of the service time. The user may further have or may not have indicated their interest in the service time through the personal service network 120 or the like, or the release of the schedule that is back to back to the preferred service time.

The intervention and adaptation engine 950 traverses through all its users that have made bookings of service times and provide visibility or notification of the real time service wait time from the current and the subsequent slots of the user's intended service time. This may or may not include users who have departed from the threshold of the likely arrival time to the intended service, depending on the user's configuration or preference on the information notification. The user in this context, has the option of visibility of the wait time upon arrival, as well as the estimated arrival information from the platform, and its implication of its own arrival time to the subsequent slot, or missing out the service time if the subsequent slot users have been placed with their priority of booking and arrival sequence.

At the time window prior to the service slot, the originally scheduled user may be likely to delay the service time indicated from either its automatically detected personal service network 120 or the like, or the intervention through communication messages. The platform recommender engine pushes this real time availability of the service time to the user who has not scheduled its service time earlier. This user may be likely to make a booking for this up-to-date availability if it has been released from the schedule, or is made available for the service time with the desired intent or need to consume the service.

This exemplary illustration presents an embodiment of the offline and online adaptation that works with the plurality of users' variability with the placeholder structure to self-adapt for the maximization of the utilization for providers and consumers, as well as minimization of wait time. One aspect of the invention presented in the exemplary illustration relates to having the correction and decrease error rate leading to maximum utilization and minimum wait time through the self-adapt architecture that allows interaction with the plurality of users characteristics from the factors in the estimator to the near time window of actualization of the service.

In one embodiment, the user that has actualized the service has its cycle time delayed. In an exemplary illustration, the cycle time is delayed from one slot time to two slot times. This delayed cycle time is fed to the latest available slot to be scheduled, with the propagation of this cycle time accounted in the subsequent scheduling. The dynamic scheduler starts to account for this delayed cycle time from its estimator 920 to maximize the scheduling utilization and wait time.

This exemplary illustration presents an embodiment on the function of the dynamic scheduler in conjunction with its adaptation and intervention engine and the estimator, to correct the real time errors incurred from the variability of the users, for the maximization of the scheduling and wait times for the actors in the system. In one embodiment, the users do not need to incur penalty (pre-booking or prepayment for consumer, utilization loss for provider) or cost of resources (provider and consumer time) to follow up for the actualization of the intended service. This is realized with the combination of the systems and methods illustrated to maximize the utilization of all actors to the minimum wait time with the parameters accounted from the upstream to actualization in a self-adapt architecture.

Current Service Slots Availability and Demand Supply Prediction

In one embodiment, users could determine the real time service slots availability with the demand and supply prediction for subsequent time landscape. Such feature facilitates consumers who do not want to incur the cost of securing the slot if services incur charges on pre-booking the service slot and they may not have confirmed the need prior to the intended time. Mathematical models for the prediction are subjected to the accuracy and assumptions of the models, as well as the data set size and characteristics, subjecting to the resolution of the real time variability of the users.

As such, one embodiment to overcome this model accuracy and assumptions with real time variability of users is a method use to hedge the risk of prediction errors of demand and supply when they reach a predetermined threshold. This may be used to allocate a reserved block of service slots to buffer the error of the prediction. These reserved service slots may be adjusted with the real time demand and supply, balancing the actual utilization with the projected error buffer.

The pseudo code is shown below:

```
Input :
P,i( demand > supply ) = probability of demand > supply at time i
Pe,i( demand > supply ) = probability error of estimation of demand >
supply
demand,i = estimated value of demand
supply,i = estimated value of supply
     If P( demand,i > supply,i ),
               hedge ratio, i = Pe, i( demand, i > supply, i )
        reserve service slots, i = Pe, i( demand, i > supply, i) *
        |demand, i − supply, i|
```

Pseudo Code or Equation of Hedging

The above exemplary illustrations may be carried in the plurality of the providers and consumers in the system, in a single or multi server queue system, with plurality of provider and provider agents real time characteristics. The above embodiments are not limited to consumer and provider relationships in the server queues, but any form of matching of requirements, characteristics in the time variant and characteristic variant in the plurality of users.

The above condition could be carried in any form of computer, network, communication devices and service network. In one embodiment, it could be carried out in the context of platform being a web base application, with integration of the application in the mobile communication devices, and with the consumer as the subscriber log in to the account.

In broad embodiment, the present invention is the coalition between matching the characteristics and requirements in the plurality of the users and the management of the availability, timing of the actors and the system parameters in a time variant and characteristic variant trajectory to minimize loss time and maximize utilization of the actors to the actualization of the event.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A system, for maximizing utilization in service slots of a plurality of users in service slots, the system comprising:

a network communication system, wherein the network communication system comprises at least a memory to store instructions, at least a processor to execute the instructions, and at least one communication component configured to communicate on a network;

an estimator, generated by the network communication system configured for determining static and dynamic characteristics within a demand and supply landscape of at least one of the plurality of users in response to one or more service slots and one or more queues of the one or more service slots and for determining static and dynamic characteristics of at least one of other ones of the plurality of users in response to the one or more service slots and the one or more queues of the one or more service slots;

a dashboard, generated by the network communication system configured for presenting information associated with probability of actualization from the network communication system engaged in network communication to a device, in response to one or more criteria selected from the group of (a) one or more of the at least one of the plurality of users through the device engaged in the network communication in response to one or more service slots and one or more queues of the one or more service slots and (b) one or more of the at least one of the other ones of the plurality of users through the device engaged in the network communication in response to one or more service slots and one or more queues of the one or more service slots; and a placeholder mechanism, generated by the network communication system configured for controlling variability of utilization of the service slots from the presented information, through placeholding the one or more service slots in response to one or more criteria selected from the group of (a) corresponding to the one or more of the at least one of the plurality of users through the device engaged in the network communication and (b) corresponding to the one or more of the at least one of the other ones of the plurality of users through the device engaged in the network communication, wherein the probability of actualization of the one or more of service slots comprises one or more criteria selected from the group of (a) corresponds to a likelihood of the one or more service slots being utilized by the at least one of the plurality of users, and (b) corresponds to a likelihood of the one or more service slots being utilized by the at least one of other ones of the plurality of users, wherein the presented information associated with the probability of actualization comprises one or more indications selected from the group of indications of (a) indicating the one or more of service slots in response to the one or more of the at least one of the plurality of users is available for placeholding, (b) indicating the one or more of service slots in response to the one or more of the at least one of the other ones of the plurality of users is available for placeholding, (c) indicating the one or more of service slots in response to the one or more of the at least one of the plurality of users is not available for placeholding, (d) indicating the one or more of service slots in response to the one or more of the at least one of the other ones of the plurality of users is not available for placeholding, (e) indicating the one or more of service slots in response to the one or more of the at least one of the plurality of users for placeholding corresponding to variability criteria or information, wherein the variability criteria or information comprises limits to changes by the placeholder mechanism, (f) indicating information corresponding to placeholding of the one or more of service slots in response to the one or more of the at least one of the plurality of users, and (g) indicating information corresponding to placeholding of the one or more of service slots in response to the one or more of the at least one of the other ones of the plurality of users, wherein the placeholder mechanism placeholds the one or more service slots in response to one or more criteria selected from the group of (a) placing or holding or changing or aborting or actualizing the one or more service slots corresponding to the one or more of the at least one of the plurality of users in response to the probability of actualization of the static and dynamic characteristics determined by the estimator at the network communication system, (b) placing or holding or changing or aborting or actualizing the one or more of the service slots corresponding to the one or more of the at least one of the plurality of users in response to the probability of actualization determined in response to an input through the device of the one or more of the at least one of the plurality of users, (c) placing or holding or changing or aborting or actualizing the one or more service slots corresponding to the one or more of the at least one of the other ones of the plurality of users in response to the probability of actualization of the static and dynamic characteristics determined by the estimator at the network communication system and (d) placing or holding or changing or aborting or actualizing the one or more of the service slots corresponding to the one or more of the at least one of the other ones of the plurality of users in response to the probability of actualization determined in response to an input through the device of the one or more of the at least one of the plurality of users, wherein the device comprises a computer implemented system and a communication component configured to communicate on a network, wherein the one or more of service slots have at least one parameter in a plurality of parameters associated therewith indicating that it is a preferred one of the one or more service slots and one or more queues of the one or more service slots corresponding to the one or more of the at least one of the plurality of users, indicating that it is one or more service slots corresponding to the one or more of the at least one of the plurality of users, indicating that it is a preferred one of the one or more service slots and one or more queues of the one or more service slots corresponding to the one or more of the at least one of the other ones of the plurality of users and indicating that it is one or more service slots corresponding to the one or more of the at least one of the other ones of the plurality of users.

2. The system in accordance with claim 1 wherein the placeholder mechanism place or hold or changes the one or more service slots by placing at least one of the one or more service slots, holding at least one of the one or more service slots, releasing at least one of the one or more service slots, aborting at least one of the one or more service slots, swapping ones of the one or more service slots or actualizing at least one of the one or more of service slots in response to one or more criteria selected from the group of (a) in response to the static and dynamic characteristics of the demand and supply landscape corresponding to the one or more of the at least one of the plurality of users, (b) in response to the static and dynamic characteristics of the demand and supply landscape corresponding the one or more of the at least one of the other ones of the plurality of users, (c) in response to variability criteria, wherein the variability criteria comprises limits to changes by the placeholder mechanism.

3. The system in accordance with claim 1 wherein the static and dynamic characteristics of the demand and supply landscape for the at least one of the plurality of users further comprises at least one parameter selected from (a) configured information of the at least one of the plurality of users, (b) historical information of the at least one of the plurality of users, (c) the at least one of the plurality of users having similar characteristics, (d) associations between the at least one of the plurality of users, and (e) real time characteristics, wherein the static and dynamic characteristics of the demand and supply landscape comprises one or more criteria selected from the group of indications including an indication of a demand within a plurality of demands corresponding to a probability of actualization by the at least one of the plurality of users of the one or more service slots or the one or more queues of the one or more service slots and an indication of supply of the one or more service slots in the plurality of service slots corresponding to a probability of actualization by the at least one of the plurality of users of the one or more service slots or the one or more queues of the one or more service slots.

4. The system in accordance with claim 3 wherein the real time characteristics for the at least one of the plurality of users comprise one or more criteria selected from the group comprising user's characteristics related to one or more service slots, provider's characteristics related to one or more service slots, provider's agent characteristics related to one or more service slots, system user's characteristics related to one or more service slots, and characteristics in response to inducing factors corresponding to one or more of the service slots, wherein the user's characteristics related to one or more service slots include information on probability of actualization of the one or more service slots or one or more queues of the one or more service slots, wherein the provider's characteristics related to one or more service slots include information on probability of wait time associated with the one or more of the service slots or one or more queues of the one or more service slots, wherein the provider agent's characteristics related to one or more service slots include information on probability of actualization of the one or more of the service slots or one or more of queues of the one or more service slots, wherein the system user's characteristics for the at least one of the plurality of users of system users comprise one or more criteria selected from system user's characteristics including information on probability of actualization of other one or more of the service slots or other one or more queues of the service slots, and wherein the other one or more of the service slots comprise one or more of the service slots or other one or more queues of the service slots for which it is an assigned or placed slot or is a non-assigned or non-placed slot for the at least one of the plurality of system users it is an assigned or placed slot or is a non-assigned or non-placed slot, wherein the inducing factors comprise one or more actions related to actualizing the service slots and releasing assigned ones of the service slots, and wherein the probability of wait time of one or more of service slots corresponds to likelihood of wait time of the one or more of the service slots.

5. The system in accordance with claim 1 wherein the estimator generates the probability of actualization of the at least one of the plurality of users of one or more of the service slots in response to criteria having at least one parameter corresponding to time, day, month, weather, traffic, locations, preference, need, state, cycle time of the at least one of the plurality of users of the one or more of the service slots, modes of transportation of the at least one of the plurality of users of the one or more of the service slots, locations of the at least one of the plurality of users of the one or more of the service slots, similar characteristics of the at least one of the plurality of users of the one or more of the service slots, and interactions through the device of the at least one of the plurality of users of the one or more of the service slots, wherein the interactions through the device comprises at least one interaction selected from the group comprising a user input through the device of the one or more of the at least one of the plurality of users of the one or more of the service slots, pushed information through the device to the one or more of the at least one of the plurality of users of one or more of the service slots and pulled information through the device from the one or more of the at least one of the plurality of users of one or more of the service slots.

6. The system in accordance with claim 2 wherein the estimator and the placeholder mechanism generate the variability criteria for placeholding in response to real time characteristics of the one or more of the at least one of the plurality of users of one or more of the service slots, wherein the variability criteria comprises one or more criteria selected from the group comprising a plurality of time periods corresponding to one or more service slots in response to time of placement of the one or more of the at least one of the plurality of users and service time of the one or more service slots associated with enabling the placeholding, a plurality of time periods corresponding to one or more service slots in response to current time of interaction through the device of the one or more of the at least one of the plurality of users and service time of the one or more service slots associated with enabling the placeholding, a plurality of time periods corresponding to one or more service slots in response to estimated time of arrival of the one or more of the at least one of the plurality of users and service time of the one or more service slots associated with enabling the placeholding, characteristics of the demand and supply landscape in response to one or more service slots for placeholding, priority for placeholding of the one or more of the at least one of the plurality of users in response to one or more service slots, weight of utilization of one or more service slots in response to the one or more of the at least one of the plurality of users placed in one or more service slots or one of the queues of one or more service slots, and weight of utilization of one or more service slots in response to the one or more of the at least one of the plurality of users not placed in one or more service slots or one of the queues of one or more service slots, wherein the estimated time of arrival of the one or more of the at least one of the plurality of users of the one or more service slots is determined in response to at least one of the parameters in the plurality of parameters corresponding to the estimate from the estimator, and from the input through the device of the one or more of the at least one of the plurality of users, and wherein the weight of utilization of one or more of the service slots is determined in response to the one or more of the at least one of the plurality of users associated with the probability of actualization of the one or more service slots by the one or more of the at least one of the plurality of users.

7. The system in accordance with claim 1 wherein the estimator generates embedded compensation in response to real time characteristics of the at least one of the plurality of users corresponding to the one or more service slots, the embedded compensation criteria selected from the group comprising static and dynamic user characteristics of the at least one of the plurality of users corresponding to one or more of the service slots, static and dynamic user characteristics of the least one of other ones of the plurality of users corresponding to one or more of the service slots, and characteristics of the demand and supply landscape in response to one or more service slots or one or more queues of the one or more service slots.

8. The system in accordance with claim 2 further comprising an intervention and adaptation engine coupled to the estimator and providing interactions and information through the device of the one or more of the at least one of the plurality of users in response to the one or more service slots, wherein the interactions and information through the device of the one or more of the at least one of the plurality of users comprise one or more criteria selected from the group comprising information pushed through the device to the one or more of the at least one of the plurality of users indicating probability of actualization of the one or more of the at least one of the plurality of users, information pulled through the device from the one or more of the at least one of the plurality of users indicating probability of actualization of the one or more of the at least one of the plurality of users, information pushed through the device to the one or more of the at least one of the plurality of users indicating the variability criteria of the one or more of the at least one of the plurality of users, interactions corresponding to the exchange of information through the device in response to one or more service slots of the one or more of the at least one of the plurality of users, probability of wait time of the one or more service slots, characteristics of demand and supply of the one or more service slots, available service slots, and time information of the one or more service slots.

9. The system in accordance with claim 8 wherein the intervention and adaptation engine generates inducing factors corresponding to the one or more of the at least one of the plurality of users in response to the one or more service slots, and wherein the inducing factors comprise one or more actions related to actualizing the one or more service slots and releasing the one or more service slots.

10. The system in accordance with claim 1 wherein the estimator initially generates a master matrix without any historical data of the at least one of the plurality of users and thereafter updates the master matrix in response to the static and dynamic characteristics of each of the plurality of users.

11. The system in accordance with claim 1 further comprising a recommender engine generated at the system coupled to the estimator for generating time realizable service slots for the at least one of the plurality of users in response to the probability of actualization for one or more of the service slots.

12. The system in accordance with claim 3 wherein the placeholder mechanism placeholds one or more of the service slots within the queue of service slots in response to embedded compensation criteria corresponding to the at least one of the plurality of users, wherein the embedded compensation criteria is selected from criteria including static and dynamic user characteristics of the at least one of the plurality of users corresponding one or more service slots, static and dynamic user characteristics of the at least one of other ones of the plurality of users corresponding one or more service slots, and characteristics of the demand and supply landscape in response to one or more service slots or one or more queues of the one or more service slots.

13. A method for maximizing utilization in service slots of a plurality of users in service slots, engaged in a network communication, the method being performed at a system, the method comprising:

determining, at the system, using an estimator, static and dynamic characteristics within a demand and supply landscape of at least one of the plurality of users in response to one or more service slots and one or more queues of the one or more service slots and for determining static and dynamic characteristics of at least one of other ones of the plurality of users in response to the one or more service slots and the one or more queues of the one or more service slots;

presenting, from the system to a device, using a dashboard, information associated with probability of actualization through the network communication, in response to one or more criteria selected from the group of (a) one or more of the at least one of the plurality of users through the device engaged in the network communication in response to one or more service slots and one or more queues of the one or more service slots and (b) one or more of the at least one of the other ones of the plurality of users through the device engaged in the network communication in response to one or more service slots and one or more queues of the one or more service slots; and placeholding, at the system, using a placeholder mechanism, the one or more service slots for controlling variability of utilization of the service slots from the presented information in response to one or more criteria selected from the group of (a) corresponding to the one or more of the at least one of the plurality of users through the device engaged in the network communication and (b) corresponding to the one or more of the at least one of the other ones of the plurality of users through the device engaged in the network communication, wherein the presented information associated with the probability of actualization comprises one or more indications selected from the group of indications of (a) indicating the one or more of service slots in response to the one or more of the at least one of the plurality of users is available for placeholding, (b) indicating the one or more of service slots in response to the one or more of the at least one of the other ones of the plurality of users is available for placeholding, (c) indicating the one or more of service slots in response to the one or more of the at least one of the plurality of users is not available for placeholding, (d) indicating the one or more of service slots in response to the one or more of the at least one of the other ones of the plurality of users is not available for placeholding, (e) indicating the one or more of service slots in response to the one or more of the at least one of the plurality of users for placeholding corresponding to variability criteria or information, wherein the variability criteria or information comprises limits to changes by the placeholder mechanism, (f) indicating information corresponding to placeholding of the one or more of service slots in response to the one or more of the at least one of the plurality of users, and (g) indicating information corresponding to placeholding of the one or more of service slots in response to the one or more of the at least one of the other ones of the plurality of users, wherein the placeholder mechanism placeholds the one or more service slots in response to one or more criteria selected from the group of (a) placing or holding or changing or aborting or actualizing the one or more service slots corresponding to the one or more of the at least one of the plurality of users in response to the probability of actualization of the static and dynamic characteristics determined by the estimator at the system, (b) placing or holding or changing or aborting or actualizing the one or more of the service slots corresponding to the one or more of the at least one of the plurality of users in response to the probability of actualization determined in response to an input through the device of the one or more of the at least one of the plurality of users, (c) placing or holding or changing or aborting or actualizing the one or more service slots corresponding to the one or more of the at least one of the other ones of the plurality of users in response to the probability of actualization of the static and dynamic characteristics determined by the estimator at the system and (d) placing or holding or changing or aborting or actualizing the one or more of the service slots corresponding to the one or more of the at least one of the other ones of the plurality of users in response to the probability of actualization determined in response to an input through the device of the one or more of the at least one of the plurality of users, wherein the one or more of service slots have at least one parameter in a plurality of parameters associated therewith indicating that it is a preferred one of the one or more service slots and one or more queues of the one or more service slots corresponding to the one or more of the at least one of the plurality of users, indicating that it is one or more service slots corresponding to the one or more of the at least one of the plurality of users, indicating that it is a preferred one of the one or more service slots and one or more queues of the one or more service slots corresponding to the one or more of the at least one of the other ones of the plurality of users and indicating that it is one or more service slots corresponding to the one or more of the at least one of the other ones of the plurality of users, wherein the system comprises at least a memory to store instructions, at least a processor to execute the instructions, and at least one communication component configured to communicate on a network, wherein the device comprises a computer implemented system and a communication component configured to communicate on a network.

14. The method in accordance with claim 13 wherein the placeholder mechanism place or hold or changes the one or more service slots by placing at least one of the one or more service slots, holding at least one of the one or more service slots, releasing at least one of the one or more service slots, aborting at least one of the one or more service slots, swapping ones of the one or more service slots or actualizing at least one of the one or more of service slots in response to one or more criteria selected from the group of (a) in response to the static and dynamic characteristics of the demand and supply landscape corresponding to the one or more of the at least one of the plurality of users, (b) in response to the static and dynamic characteristics of the demand and supply landscape corresponding the one or more of the at least one of the other ones of the plurality of users, (c) in response to variability criteria, wherein the variability criteria comprises limits to changes by the placeholder mechanism.

15. The method in accordance with claim 13 wherein determining the probability of actualization determined in response to an input through the device of the at least one of the plurality of users comprises determining the probability of actualization of the at least one of the plurality of users of one or more of the service slots in response to criteria having at least one parameter corresponding to time, day, month, weather, traffic, locations, preference, need, state, cycle time of the at least one of the plurality of users of the one or more of the service slots, modes of transportation of the at least one of the plurality of users of the one or more of the service slots, locations of the at least one of the plurality of users of the one or more of the service slots, similar characteristics of the at least one of the plurality of users of the one or more of the service slots, and interactions through the device of the at least one of the plurality of users of the one or more of the service slots, wherein the interactions through the device comprises at least one interaction selected from the group comprising a user input through the device of the one or more of the at least one of the plurality of users of the one or more of the service slots, pushed information through the device of the one or more of the at least one of the plurality of users of one or more of the service slots and pulled information through the, device of the one or more of the at least one of the plurality of users of one or more of the service slots.

16. The method in accordance with claim 13 wherein the static and dynamic characteristics of the demand and supply landscape for the at least one of the plurality of users further comprises at least one parameter selected from (a) configured information of the at least one of the plurality of users, (b) historical information of the at least one of the plurality of users, (c) the at least one of the plurality of users having similar characteristics, (d) associations between the at least one of the plurality of users, and (e) real time characteristics, wherein the static and dynamic characteristics of the demand and supply landscape comprises one or more criteria selected from the group of indications including an indication of a demand within a plurality of demands corresponding to a probability of actualization by the at least one of the plurality of users of the one or more service slots or the one or more queues of the one or more service slots and an indication of supply of the one or more service slots in the plurality of service slots corresponding to a probability of actualization by the at least one of the plurality of users of the one or more service slots or the one or more queues of the one or more service slots, wherein the real time characteristics for the at least one of the plurality of users comprise one or more criteria selected from the group comprising user's characteristics related to one or more service slots, provider's characteristics related to one or more service slots, provider's agent characteristics related to one or more service slots, system user's characteristics related to one or more service slots, and characteristics in response to inducing factors corresponding to one or more of the service slots, wherein the user's characteristics related to one or more service slots include information on probability of actualization of the one or more service slots or one or more queues of the one or more service slots, wherein the provider's characteristics related to one or more service slots include information on probability of wait time associated with the one or more of the service slots or one or more queues of the one or more service slots, wherein the provider agent's characteristics related to one or more service slots include information on probability of actualization of the one or more of the service slots or one or more of queues of the one or more service slots, wherein the system user's characteristics for the at least one of the plurality of system users comprise one or more criteria selected from system user's characteristics including information on probability of actualization of other one or more of the service slots or other one or more queues of the service slots, and wherein the other one or more of the service slots comprise one or more of the service slots or other one or more queues of the service slots for which it is an assigned or placed slot or is a non-assigned or non-placed slot for the at least one of the plurality of system users it is an assigned or placed slot or is a non-assigned or non-placed slot, wherein the inducing factors comprise one or more actions related to actualizing the service slots and releasing assigned ones of the service slots, and wherein the probability of wait time of one or more of service slots corresponds to likelihood of wait time of the one or more of the service slots.

17. The method in accordance with claim 14 comprising generating the variability criteria for placeholding in response to real time characteristics of the one or more of the at least one of the plurality of users of one or more of the service slots, wherein the variability criteria comprises one or more criteria selected from the group comprising a plurality of time periods corresponding to one or more service slots in response to time of placement of the one or more of the at least one of the plurality of users and service time of the one or more service slots associated with enabling the placeholding, a plurality of time periods corresponding to one or more service slots in response to current time of interaction through the device of the one or more of the at least one of the plurality of users and service time of the one or more service slots associated with enabling the placeholding, a plurality of time periods corresponding to one or more service slots in response to estimated time of arrival of the one or more of the at least one of the plurality of users and service time of the one or more service slots associated with enabling the placeholding, characteristics of the demand and supply landscape in response to one or more service slots for placeholding, priority for placeholding of the one or more of the at least one of the plurality of users in response to one or more service slots, weight of utilization of one or more service slots in response to the one or more of the at least one of the plurality of users placed in one or more service slots or one of the queues of one or more service slots, and weight of utilization of one or more service slots in response to the one or more of the at least one of the plurality of users not placed in one or more service slots or one of the queues of one or more service slots, wherein the estimated time of arrival of the one or more of the at least one of the plurality of users of the one or more service slots is determined in response to at least one of the parameters in the plurality of parameters corresponding to the estimate from the estimator, and from the input through the device of the one or more of the at least one of the plurality of users, and wherein the weight of utilization of one or more of the service slots is determined in response to the one or more of the at least one of the plurality of users associated with the probability of actualization of the one or more service slots by the one or more of the at least one of the plurality of users.

18. The method in accordance with claim 13 further comprising generating embedded compensation in response to real time characteristics of the at least one of the plurality of users corresponding to the one or more service slots, the embedded compensation criteria selected from the group comprising static and dynamic user characteristics of the at least one of the plurality of users corresponding to one or more of the service slots, static and dynamic user characteristics of the at least one of other ones of the plurality of users corresponding to one or more of the service slots, and characteristics of the demand and supply landscape in response to one or more service slots or one or more queues of the one or more service slots.

19. The method in accordance with claim 14 further comprising generating interactions and information through the device of the one or more of the at least one of the plurality of users in response to the one or more service slots, wherein the interactions and information through the device of the one or more of the at least one of the plurality of users comprise one or more criteria selected from the group comprising information pushed through the device to the one or more of the at least one of the plurality of users indicating probability of actualization of the one or more of the at least one of the plurality of users, information pulled through the device from the one or more of the at least one of the plurality of users indicating probability of actualization of the one or more of the at least one of the plurality of users, information pushed through the device to the one or more of the at least one of the plurality of users indicating the variability criteria of the one or more of the at least one of the plurality of users, interactions corresponding to the exchange of information through the device in response to one or more service slots of the one or more of the at least one of the plurality of users, probability of wait time of the one or more service slots, characteristics of demand and supply of the one or more service slots, available service slots, and time information of the one or more service slots.

20. The method in accordance with claim 19 further comprising the steps of generating inducing factors corresponding to the one or more of the at least one of the plurality of users in response to the one or more service slots, and wherein the inducing factors comprise one or more actions related to actualizing the one or more service slots and releasing the one or more service slots.

21. The method in accordance with claim 13 comprising initially generating a master matrix without any historical data of the at least one of the plurality of users, and
wherein the determination step thereafter updates the master matrix in response to the static and dynamic characteristics of each of the plurality of users.

22. The method in accordance with claim 13 further comprising the steps of generating time realizable service slots for the at least one of the plurality of users in response to the probability of actualization for one or more of the service slots.

23. The method in accordance with claim 16 wherein the placeholding one or more of the service slots within the queue of service slots comprises placeholding one or more of the service slots within the queue of service slots in response to embedded compensation criteria corresponding to the at least one of the plurality of users, wherein the embedded compensation criteria is selected from criteria including static and dynamic user characteristics of the at least one of the plurality of users corresponding one or more service slots, static and dynamic user characteristics of the at least one of other ones of the plurality of users corresponding one or more service slots, and characteristics of the demand and supply landscape in response to one or more service slots or one or more queues of the one or more service slots.

24. A non-transitory computer readable storage medium configured to store instructions that, when executed by a processor of a system, perform functions for maximizing utilization in service slots of a plurality of users in service slots, engaged in a network communication, comprising:
determining, at the system, using an estimator, static and dynamic characteristics within a demand and supply landscape of at least one of the plurality of users in response to one or more service slots and one or more queues of the one or more service slots and for determining static and dynamic characteristics of at least one of other ones of the plurality of users in response to the one or more service slots and the one or more queues of the one or more service slots;
presenting, from the system to a device, using a dashboard, information associated with probability of actualization through the network communication, in response to one or more criteria selected from the group of (a) one or more of the at least one of the plurality of users through the device engaged in the network communication in response to one or more service slots and one or more queues of the one or more service slots and (b) one or more of the at least one of the other ones of the plurality of users through the device engaged in the network communication in response to one or more service slots and one or more queues of the one or more service slots; and placeholding, at the system, using a placeholder mechanism, the one or more service slots for controlling variability of utilization of the service slots from the presented information in response to one or more criteria selected from the group of (a) corresponding to the one or more of the at least one of the plurality of users through the device engaged in the network communication and (b) corresponding to the one or more of the at least one of the other ones of the plurality of users through the device engaged in the network communication, wherein the presented information associated with the probability of actualization comprises one or more indications selected from the group of indications of (a) indicating the one or more of service slots in response to the one or more of the at least one of the plurality of users is available for placeholding, (b) indicating the one or more of service slots in response to the one or more of the at least one of the other ones of the plurality of users is available for placeholding, (c) indicating the one or more of service slots in response to the one or more of the at least one of the plurality of users is not available for placeholding, (d) indicating the one or more of service slots in response to the one or more of the at least one of the other ones of the plurality of users is not available for placeholding, (e) indicating the one or more of service slots in response to the one or more of the at least one of the plurality of users for placeholding corresponding to variability criteria or information, wherein the variability criteria or information comprises limits to changes by the placeholder mechanism, (f) indicating information corresponding to placeholding of the one or more of service slots in response to the one or more of the at least one of the plurality of users, and (g) indicating information corresponding to placeholding of the one or more of service slots in response to the one or more of the at least one of the other ones of the plurality of users, wherein the placeholder mechanism placeholds the one or more service slots in response to one or more criteria selected from the group of (a) placing or holding or changing or aborting or actualizing the one or more service slots corresponding to the one or more of the at least one of the plurality of users in response to the probability of actualization of the static and dynamic characteristics determined by the estimator at the system, (b) placing or holding or changing or aborting or actualizing the one or more of the service slots corresponding to the one or more of the at least one of the plurality of users in response to the probability of actualization determined in response to an input through the device of the one or more of the at least one of the plurality of users, (c) placing or holding or changing or aborting or actualizing the one or more service slots corresponding to the one or more of the at least one of the other ones of the plurality of users in response to the probability of actualization of the static and dynamic characteristics determined by the estimator at the system and (d) placing or holding or changing or aborting or actualizing the one or more of the service slots corresponding to the one or more of the at least one of the other ones of the plurality of users in response to the probability of actualization determined in response to an input through the device of the one or more of the at least one of the plurality of users, wherein the one or more of service slots have at least one parameter in a plurality of parameters associated therewith indicating that it is a preferred one of the one or more service slots and one or more queues of the one or more service slots corresponding to the one or more of the at least one of the plurality of users, indicating that it is one or more service slots corresponding to the one or more of the at least one of the plurality of users, indicating that it is a preferred one of the one or more service slots and one or more queues of the one or more service slots corresponding to the one or more of the at least one of the other ones of the plurality of users and indicating that it is one or more service slots corresponding to the one or more of the at least one of the other ones of the plurality of users, wherein the system comprises at least a memory to store instructions, at least a processor to execute the instructions, and at least one communication component configured to communicate on a network, wherein the device comprises a computer implemented system and a communication component configured to communicate on a network.

* * * * *